United States Patent
Franco et al.

[19]

[11] Patent Number: 6,164,564
[45] Date of Patent: Dec. 26, 2000

[54] APPARATUS FOR CLEANING OR DE-ICING A VEHICLE WINDOW

[75] Inventors: Shlomi Franco, Tel Aviv; Vychislav Ivanov, Kiryat Tivon; Joseph Rogozinski, Ramat Can; Uri Arkashevski; Hain Levy, both of Petach Tikva, all of Israel

[73] Assignee: Micro-Heat, Inc., New York, N.Y.

[21] Appl. No.: 09/187,654

[22] Filed: Nov. 6, 1998

[51] Int. Cl.[7] ...................................................... B05B 1/10
[52] U.S. Cl. ............................ 239/284.1; 239/139; 251/7
[58] Field of Search ............................. 239/284.1, 284.2, 239/130, 131, 135, 139; 392/479, 480, 481, 485, 488, 489, 491, 492, 478; 251/6, 7; 15/250.05; 122/14

[56] References Cited

U.S. PATENT DOCUMENTS

| | | |
|---|---|---|
| 653,629 | 7/1900 | Schneider . |
| 3,979,068 | 9/1976 | Applebaum . |
| 4,090,668 | 5/1978 | Kochenour . |
| 4,106,508 | 8/1978 | Berlin ...................................... 251/7 X |
| 5,012,977 | 5/1991 | Karklins et al. . |
| 5,118,040 | 6/1992 | Abe . |
| 5,254,083 | 10/1993 | Gentelia et al. ......................... 251/7 X |
| 5,354,965 | 10/1994 | Lee . |
| 5,383,247 | 1/1995 | Nickel ............................... 15/250.05 X |
| 5,509,606 | 4/1996 | Breithaupt . |
| 5,927,608 | 7/1999 | Scorsiroli .............................. 239/284.1 |
| 5,947,348 | 9/1999 | Briski ....................................... 251/7 X |
| 5,957,384 | 9/1999 | Lansinger ............................. 239/284.1 |
| 5,988,529 | 11/1999 | Luhring ................................. 239/284.1 |

*Primary Examiner*—Harold Joyce
*Attorney, Agent, or Firm*—Gottlieb Rackman & Reisman PC

[57] ABSTRACT

Apparatus for cleaning or de-icing a vehicle window, including a reservoir for containing therein a washing fluid, a vessel having an inlet through which the washing fluid is received from the reservoir and an outlet through which the fluid is discharged for cleaning a vehicle window, and a first heating element disposed in the vessel for heating the fluid in the vessel, characterized by an auxiliary heating element being disposed in the vessel for heating the fluid in the vessel, wherein the auxiliary heating element is disposed at a bottom portion of the vessel and is operative to heat a quantity of fluid which is not necessarily sufficient to cover the first heating element.

17 Claims, 19 Drawing Sheets

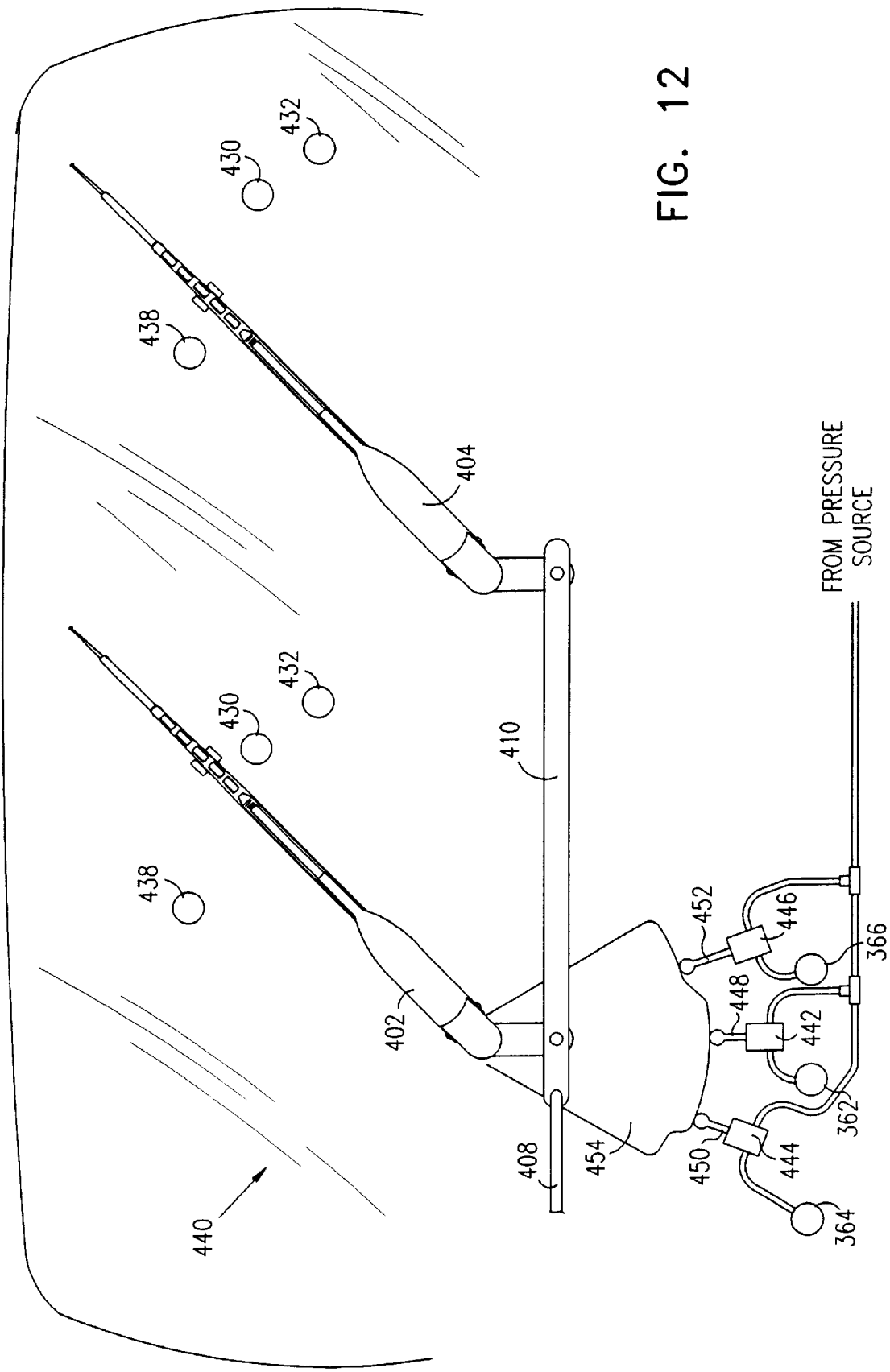

APPARATUS FOR CLEANING OR DE-ICING A VEHICLE WINDOW

FIELD OF THE INVENTION

The present invention relates generally to apparatus for cleaning or de-icing a vehicle window.

BACKGROUND OF THE INVENTION

Various methods and devices are known in the art for providing a spray of heated water or other washing fluid onto the windows of a vehicle. The heated fluid is particularly advantageous in removing ice from the vehicle windshield in cold weather. This ice removal function requires that a driver of the vehicle wait while the fluid is heated, before the windshield can be de-iced. Methods and devices known in the art are impractical for this purpose, however, since they typically use heat or electricity generated by the vehicle engine itself to heat the fluid, requiring the driver to wait an unacceptably long time for the fluid to reach a suitable temperature.

Using the vehicle battery to heat the fluid, independent of the vehicle engine, is also problematic because of the large current draw required to heat a sufficient quantity of fluid to effectively de-ice the windshield. The battery cannot typically provide sufficient current to heat the vehicle's entire reservoir of washing fluid in a reasonable amount of time. Although methods and devices have been suggested for heating the fluid on-line, as it is about to be sprayed on the windshield, the battery also cannot provide enough current to heat a spray of sufficient volume to a high enough temperature to achieve effective de-icing.

U.S. Pat. No. 5,509,606 describes a hot wash device for an automobile windshield, which includes a container into which washing fluid from a reservoir is pumped and in which the fluid is heated by an electrical heating element before it is sprayed onto the windshield. The container is insulated and includes a thermostat that is used to ensure that the temperature of the fluid does not exceed a predetermined maximum. The container is kept full, with heat applied as needed to bring the cold fluid pumped into the container up to the desired temperature.

U.S. Pat. No. 5,118,040 describes electric apparatus for washing window glass of a vehicle. An insulated container is positioned between a reservoir of cold washing fluid and spray outlets to the vehicle window, in a position lower than the reservoir so as to be kept full of fluid. When the vehicle ignition is turned on, an electric heater heats the fluid in the container and remains active while the vehicle is in use. There is no provision, however, for rapid start-up and heating to de-ice the vehicle window.

U.S. Pat. No. 4,090,668 describes a windshield washing and deicing system which includes a reservoir having a sealed container therein. A pump transfers washer fluid from the reservoir to the container and from the container to a plurality of nozzles. Heated engine coolant is passed through a conduit in the reservoir. Electrical resistance wire heats the fluid in the container whenever the temperature drops below a certain minimum. Solenoid valves direct the spray from the tank to the front or rear window of the vehicle, but there is no suggestion of using the valves for any other fluid control purposes.

U.S. Pat. No. 5,012,977 describes a vehicle window washer in which washer fluid in a reservoir is heated, and in which a pump for spraying the fluid on the vehicle window has a variable outlet pressure. The temperature of the fluid in the reservoir is sensed, and the pump outlet pressure is varied accordingly in an inverse manner with temperature of the washer fluid, so as to maintain a more consistent fluid deposit on the window, as the fluid viscosity changes with temperature.

U.S. Pat. No. 5,354,965 describes a system for electrically heating a volume of windshield cleaning fluid in a motor vehicle. A vessel is filled with the volume of fluid to be heated, using PTC thermistors or other electrical heating elements. A control circuit regulates the length of time that the fluid is heated, in accordance with a prevailing ambient temperature, before the fluid is sprayed on the windshield. The circuit also prevents operation of the fluid heating when the vehicle engine is not running.

PCT Application PCT/US98/13023, assigned to the present assignee, describes de-icing apparatus in which a vessel is provided for heating a washing fluid before the fluid is discharged toward a window of a vehicle. Before the fluid is introduced into the vessel, the vessel is preheated, preferably by passing an electrical current through a heating element in the vessel for about one minute or less. When preheating is completed, the fluid is allowed into the vessel and is rapidly heated by contact therewith, leading to an increase in pressure in the vessel due to vaporization of a portion of the fluid. The fluid is then discharged at a desired temperature and pressure so as to clean and/or de-ice the window.

Although the preheating of the vessel draws only a moderate electrical input from the vehicle battery, it enables a sufficient quantity of hot fluid to be generated for de-icing the window before starting the vehicle more rapidly than in any practical window cleaning system known in the art. Moreover, the pressure generated by vaporization of the fluid helps to clear ice or other blockages that may have formed in tubing or nozzles through which the fluid is sprayed onto the window. It is also noted that spraying the heated fluid on the window's exterior surface effectively defogs its interior surface, as well.

SUMMARY OF THE INVENTION

It is an object of the present invention to provide improvements to the apparatus and methods for cleaning or de-icing a vehicle window disclosed in PCT Application PCT/US98/13023.

In preferred embodiments of the present invention, a vessel is provided for heating a washing fluid before the fluid is discharged toward a window of a vehicle. Before the fluid is introduced into the vessel, the vessel is preheated, preferably by passing an electrical current through a heating element in the vessel for about one minute, for example. When preheating is completed, the fluid is allowed into the vessel and is rapidly heated by contact therewith, leading to an increase in pressure in the vessel due to vaporization of a portion of the fluid. The fluid is then discharged at a desired temperature and pressure so as to clean and/or de-ice the window.

Although the preheating of the vessel draws only a moderate electrical input from the vehicle battery, it enables a sufficient quantity of hot fluid to be generated for de-icing the window before starting the vehicle more rapidly than in any practical window cleaning system known in the art.

In some preferred embodiments of the present invention, after an initial quantity of the fluid has been heated and discharged from the vessel, a further quantity is introduced into the vessel and immediately heated. Once the further quantity has reached a desired temperature, it too is discharged, preferably after a delay of several seconds. This process continues for repeated heat/discharge cycles, until the window has been completely cleaned and de-iced. Preferably, the heat/discharge cycles are timed in a sequence whose parameters, such as discharge duration and intervals between discharges, are varied in accordance with ambient temperatures of the vehicle and the unheated fluid.

It will be understood that the term "vehicle" as used in the context of the present patent application and in the claims can refer to any type of wheeled vehicle having windows, such as an automobile or truck, as well as to a boat or airplane. Furthermore, the term "window," although typically referring to a windshield of a vehicle, can refer to any transparent surface, including side and rear windows and outer mirrors, as well as covers of headlights and the like. In addition, whenever the term "cleaning" is used in the present application and in the claims in reference to an action involving spraying heated fluid on a window, the term will be understood to comprehend de-icing, as well. Those skilled in the art will appreciated that the principles of the present invention may be adapted for cleaning and de-icing other surfaces, including internal windows and mirrors, for example, as well as for supplying fluid for other purposes. For example, the system of the present invention provides a bypass route for washer fluid to be directly sprayed on the windshield for routine cleaning thereof There is thus provided in accordance with a preferred embodiment of the present invention apparatus for cleaning or de-icing a vehicle window, including a reservoir for containing therein a washing fluid, a vessel having an inlet through which the washing fluid is received from the reservoir and an outlet through which the fluid is discharged for cleaning a vehicle window, and a first heating element disposed in the vessel for heating the fluid in the vessel, characterized by an auxiliary heating element being disposed in the vessel for heating the fluid in the vessel, wherein the auxiliary heating element is disposed at a bottom portion of the vessel and is operative to heat a quantity of fluid which is not necessarily sufficient to cover the first heating element.

In accordance with a preferred embodiment of the present invention there is also provided a plurality of sensors which feed data concerning at least one of a temperature and a fluid level of the fluid in the vessel to a controller, the controller controlling energization of the first and auxiliary heating elements in response to the data.

There is also provided in accordance with a preferred embodiment of the present invention apparatus for cleaning or de-icing a vehicle window, including a reservoir for containing therein a washing fluid, a vessel having an inlet through which the washing fluid is received from the reservoir and an outlet through which the fluid is discharged, a spray head in fluid communication with the outlet through which the fluid is sprayed onto a vehicle window, and a heating element disposed in the vessel for heating the fluid in the vessel, characterized by a temperature sensor mounted in propinquity to the spray head, the temperature sensor being in communication with a controller which controls heating of the heating element in response to a temperature sensed by the temperature sensor.

There is also provided in accordance with a preferred embodiment of the present invention apparatus for cleaning or de-icing a vehicle window, including a reservoir for containing therein a washing fluid, a vessel having an inlet through which the washing fluid is received from the reservoir and an outlet through which the fluid is discharged, a spray head in fluid communication with the outlet through which the fluid is sprayed onto a vehicle window, and a heating element disposed in the vessel for heating the fluid in the vessel, characterized by a wind speed sensor in communication with a controller, wherein the controller correlates a wind speed sensed by the wind speed sensor to a temperature of the fluid sprayed from the spray head, and controls heating of the heating element in response to the wind speed sensed by the wind speed sensor.

In accordance with a preferred embodiment of the present invention there is also provided a vehicle speed sensor, wherein the controller also correlates a vehicle speed sensed by the vehicle speed sensor to a temperature of the fluid sprayed from the spray head, and controls heating of the heating element in response to the vehicle speed sensed by the vehicle speed sensor.

There is also provided in accordance with a preferred embodiment of the present invention apparatus for cleaning or de-icing a vehicle window, including a reservoir for containing therein a washing fluid, a vessel having an inlet through which the washing fluid is received from the reservoir and an outlet through which the fluid is discharged for cleaning a vehicle window, and a first heating element disposed in the vessel for heating the fluid in the vessel, characterized by a pumping system in fluid communication with the reservoir and the vessel which selectively pumps fluid from the reservoir to the vessel and drains the fluid from the vessel back to the reservoir.

In accordance with a preferred embodiment of the present invention the pumping system includes at least one solenoid in fluid communication with the reservoir and the vessel and switchable from a first position to a second position, wherein in the first position the at least one solenoid permits flow from the reservoir to the vessel and substantially prevents draining the fluid from the vessel back to the reservoir, and wherein in the second position the at least one solenoid permits draining the fluid from the vessel back to the reservoir and substantially prevents flow from the reservoir to the vessel.

In accordance with a preferred embodiment of the present invention the pumping system includes a reversible pump which in a first operating orientation pumps the fluid from the reservoir to the vessel and in a second operating orientation pumps the fluid from the vessel back to the reservoir. Preferably the reversible pump includes a geared pump.

There is also provided in accordance with a preferred embodiment of the present invention apparatus for cleaning or de-icing a vehicle window, including a reservoir for containing therein a washing fluid, a vessel having an inlet through which the washing fluid is received from the reservoir and an outlet through which the fluid is discharged, a spray head in fluid communication with the outlet through which the fluid is sprayed onto a vehicle window, a windshield wiper for wiping the window, and characterized by the spray head including a multi-outlet spray head that includes a plurality of spray outlets.

In accordance with a preferred embodiment of the present invention a controller is provided which controls a spraying pattern of the plurality of outlets.

In accordance with a preferred embodiment of the present invention a sensor is provided for sensing an angular position of the windshield wiper, wherein the controller controls the spraying pattern of the plurality of outlets in accordance with the angular position of the windshield wiper. A motor is preferably provided which actuates the windshield wiper.

In accordance with a preferred embodiment of the present invention a cam is mounted on the windshield wiper, the cam selectively opening the outlets to permit flow of the fluid therethrough.

In accordance with a preferred embodiment of the present invention a motor is provided which actuates the windshield wiper and a sensor for sensing a torque of the motor, wherein the controller controls the spraying pattern of the plurality of outlets in accordance with the torque of the motor.

In accordance with a preferred embodiment of the present invention the windshield wiper wipes the window between two limits of travel, and the windshield wiper is placeable in a summer parking mode and a winter parking mode, wherein in the summer parking mode, the wiper is at rest generally at one of the limits of travel, and wherein in the winter parking mode, the wiper is between the limits of travel.

There is also provided in accordance with a preferred embodiment of the present invention apparatus for cleaning or de-icing a vehicle window, including a reservoir for containing therein a washing fluid, a vessel having an inlet through which the washing fluid is received from the reservoir and an outlet through which the fluid is discharged, a spray head in fluid communication with the outlet through which the fluid is sprayed onto a vehicle window, a windshield wiper for wiping the window, and characterized by the windshield wiper having a longitudinal bore formed therethrough for flow of the fluid therethrough, wherein the bore fluidly communicates with a plurality of outlet holes formed in the wiper for applying the fluid on the window.

In accordance with a preferred embodiment of the present invention the fluid enters the bore at one end of the wiper and an opposite end of the wiper is substantially sealed.

There is also provided in accordance with a preferred embodiment of the present invention apparatus for cleaning or de-icing a vehicle window, including a reservoir for containing therein a washing fluid, a vessel having an inlet through which the washing fluid is received from the reservoir and an outlet through which the fluid is discharged for cleaning a vehicle window, and characterized by further including a cartridge which dispenses an additive to the fluid prior to discharging the fluid.

In accordance with a preferred embodiment of the present invention the cartridge includes a solid block of the additive.

Further in accordance with a preferred embodiment of the present invention the cartridge fits into an apertured holder which is sealed by a plug, the plug including a threaded neck and a neck portion formed with a plurality of through holes, the holes being in fluid communication with a bore which is in turn in fluid communication with the apertured holder, and wherein the threaded neck can be screwed into a container through which the fluid can flow into the vessel, wherein the additive is mixed with the fluid as the fluid flows through the container.

There is also provided in accordance with a preferred embodiment of the present invention apparatus for cleaning or de-icing a vehicle window, including a reservoir for containing therein a washing fluid, a vessel having an inlet through which the washing fluid is received from the reservoir and an outlet through which the fluid is discharged for cleaning a vehicle window, and characterized by further including a fluid authorization system for verifying use of an authorized fluid.

In accordance with a preferred embodiment of the present invention the fluid authorization system includes a membrane constructed of a material that disintegrates if it is not in the presence of a fluid authorized for use.

There is also provided in accordance with a preferred embodiment of the present invention apparatus for cleaning or de-icing a vehicle window, including a reservoir for containing therein a washing fluid, a vessel having an inlet through which the washing fluid is received from the reservoir and an outlet through which the fluid is discharged for cleaning a vehicle window, and characterized by further including at least one tube in fluid communication with the fluid and a solenoid which selectively squeezes and seals the at least one tube to prevent passage of the fluid therethrough and selectively permits flow of the fluid therethrough.

BRIEF DESCRIPTION OF THE DRAWINGS

The present invention will be more fully understood from the following detailed description of the preferred embodiments thereof, taken together with the drawings in which:

FIGS. 8 and 9 are simplified pictorial illustrations of a windshield wiper actuator system constructed and operative in accordance with a preferred embodiment of the present invention, wherein FIG. 8 illustrates a summer parking mode and FIG. 9 illustrates a winter parking mode;

FIG. 12 is a simplified illustration of a cam system for controlling a spray head during the operating sequence of the windshield wiper actuator system of FIGS. 11A–11F, in accordance with a preferred embodiment of the present invention;

DETAILED DESCRIPTION OF PREFERRED EMBODIMENTS

Figure 1:
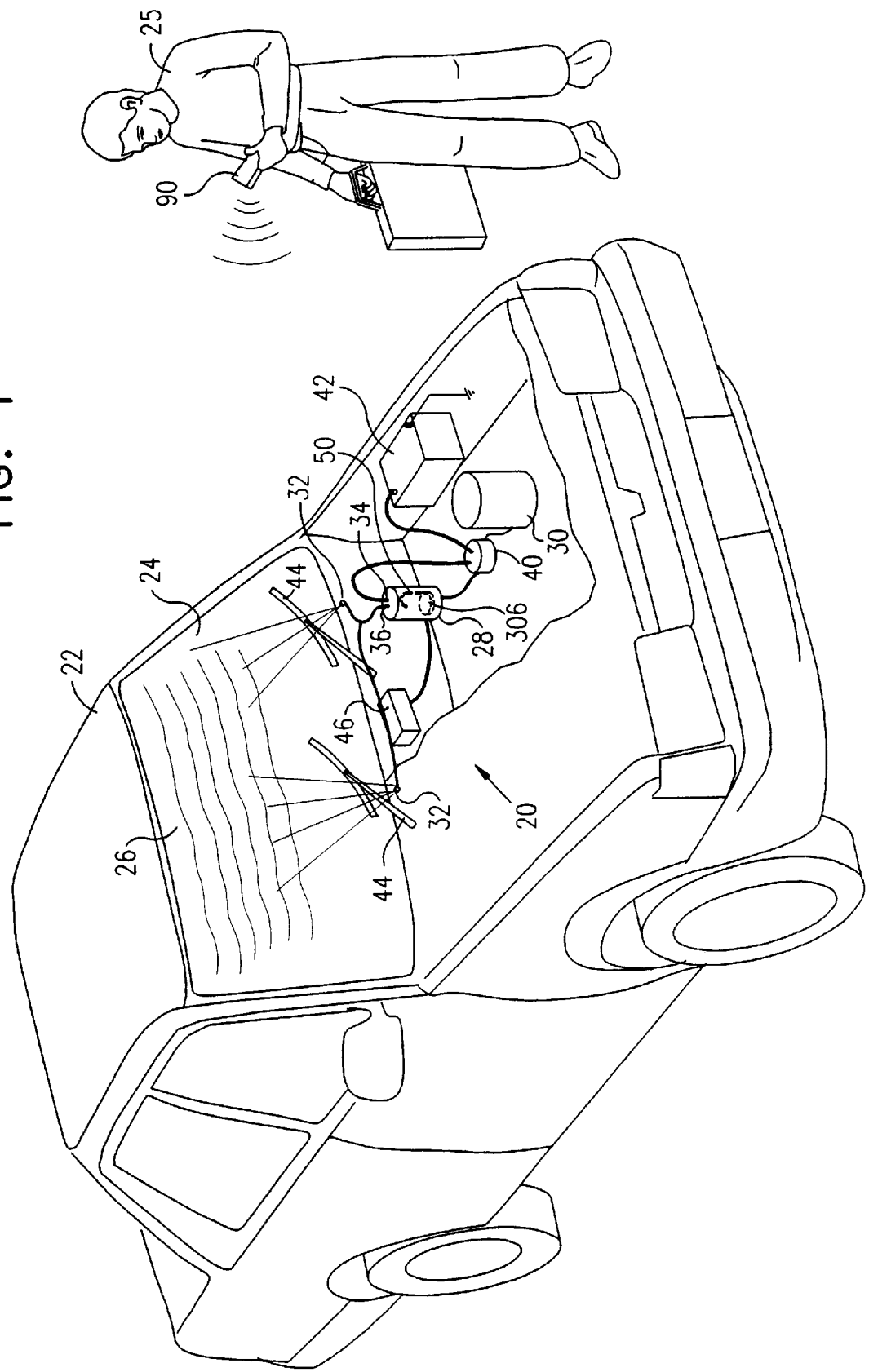
FIG. 1 is a schematic, pictorial illustration showing apparatus for cleaning a windshield of an automobile with heated washing fluid, in accordance with a preferred embodiment of the present invention.

Reference is now made to FIG. 1, which is a schematic pictorial illustration showing electrically powered window de-icing and cleaning apparatus 20 for vehicles, in accordance with a preferred embodiment of the present invention, shown assembled for use in an automobile 22 having a windshield 24 coated with ice 26.

A heatable vessel 28 for windshield washing fluid is connected between a washing fluid reservoir 30 of automobile 22 and spray heads 32, which spray the fluid onto windshield 24 when actuated by an operator 25 of the automobile. The operator may actuate the apparatus either from inside or outside automobile 22, such as by means of a remote control 90, as shown in FIG. 1 and described further hereinbelow. Vessel 28 has an inlet port 34, which receives washer fluid from reservoir 30, and an outlet port 36 through which heated fluid is discharged to spray heads 32. The fluid is driven by a pump 40, which is generally already present in automobile 22 for spraying unheated fluid to clean windshield 24. A battery 42 provides power to apparatus 20, and wipers 44 clean melted ice and dirt from the windshield, as is known in the art. A controller 46 regulates the operation of apparatus 20, and optionally also controls wipers 44 in conjunction with operation of the apparatus. Other aspects and details of the apparatus 20 are described further hereinbelow.

Figure 2:
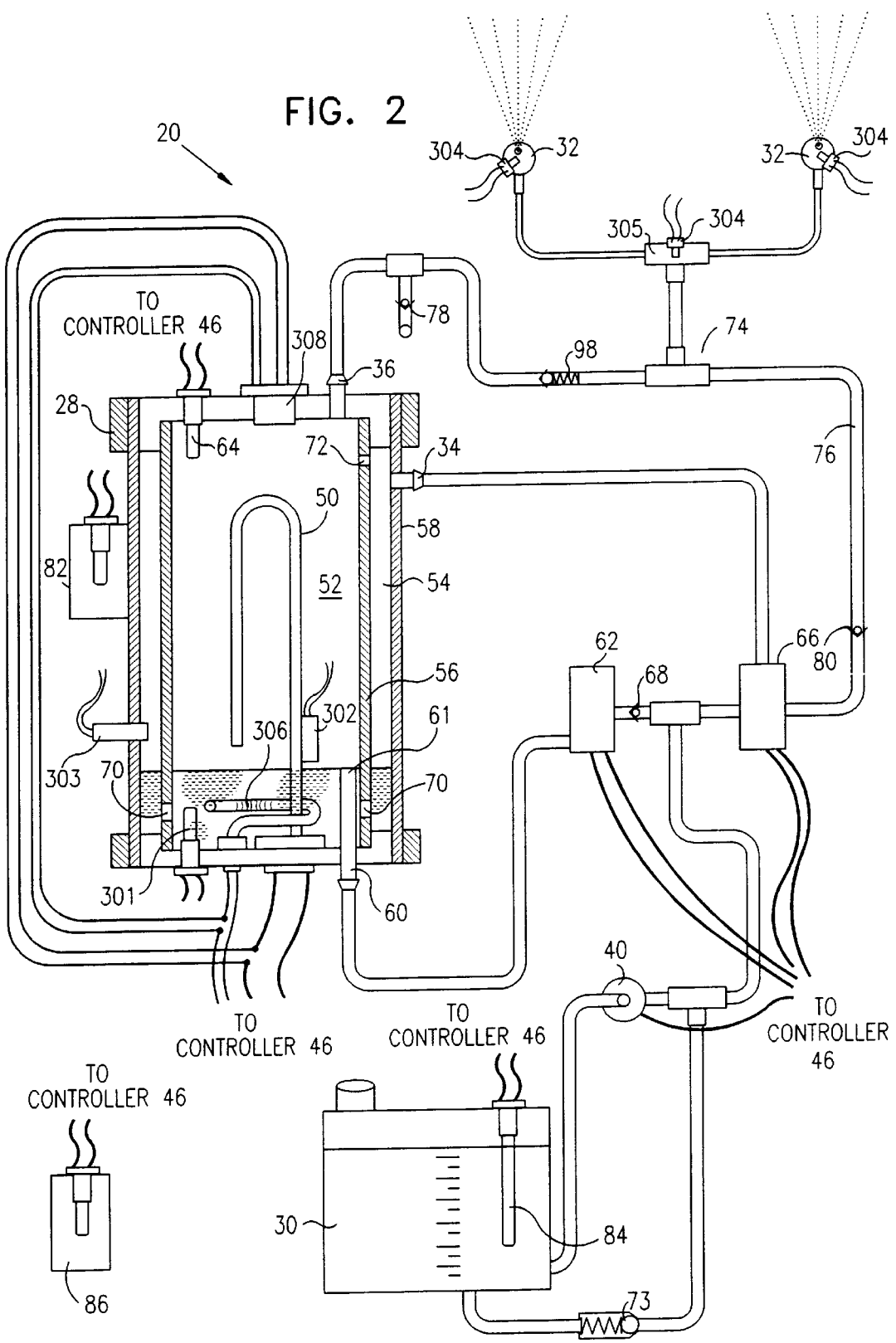
FIG. 2 is a schematic diagram showing details of the cleaning apparatus of FIG. 1, in accordance with a preferred embodiment of the present invention.

Reference is now made to FIG. 2 which shows details of vessel 28 and other elements of apparatus 20, in accordance with a preferred embodiment of the present invention. Vessel 28 is generally cylindrical in shape and comprises an inner chamber 52 surrounded by an outer chamber 54. Inner chamber 52 is contained and defined by an inner wall 56, preferably constructed of a metal such as stainless steel. Outer chamber 54 is surrounded by an outer wall 58 of the vessel, preferably constructed of an insulating material, such as a plastic. A heating element 50 inside inner chamber 52 heats the fluid in vessel 28. As a result of the concentric arrangement of chambers 52 and 54, heat losses from vessel 28 are minimized, since heat lost by the hot fluid in chamber 52 is used largely to pre-heat the colder fluid in chamber 54. Since the fluid in chamber 54 is cooler, its heat losses through outer wall 58 are relatively small.

Heating element 50 preferably comprises a resistively-heated electrical element, which is powered by battery 42 via controller 46, in accordance with a heating sequence described further hereinbelow. Alternatively or additionally, element 50 may be heated by exchange of heat with a heat source in automobile 22, such as the engine cooling fluid or exhaust. Electrical heating by battery 42 is advantageous, however, since it allows vessel 28 to be heated rapidly even before the automobile is started. Preferably, element 50 draws approximately 400 W, which typical automobile batteries can supply easily. Moreover, vessel 28 is preferably sized so that within about one minute or less of actuation, it is capable of heating and discharging fluid of a volume and temperature sufficient to melt ice 26. For this purpose, inner chamber 52 preferably contains about 50 ml of the fluid. It will be appreciated, however, that the principles of the present invention may similarly be applied by scaling the volume of vessel 28 and the power of element 50 to any required capacity. In particular, when apparatus 20 is used in larger vehicles, such as trucks or boats, the volume and power draw of the vessel will typically be substantially larger than in automobile 22.

After an initial quantity of heated fluid has been discharged, pump 40 and inlet valve 66 are operated to refill vessel 28. Although heating element 50 and wall 56 are no longer as hot as they were before the initial quantity of the fluid was introduced into the vessel, they still retain some residual heat, facilitating rapid heating of the refilled fluid. When the refilled fluid reaches a desired temperature, preferably with heating element 50 reaching a temperature of several hundred ° C., and/or after a predetermined period of time, it is discharged through spray heads 32. This process is repeated a desired number of times in sequence, until an entire sequence of discharges has been completed, as described hereinbelow, or until the windshield has been cleaned and/or de-iced, or until the temperature in vessel 28 drops below a predetermined minimum, or until it is interrupted by operator 25. The driver may then again actuate apparatus 20 and begin a new cycle of heating and fluid discharge.

Preferably, each time vessel 28 is refilled, heated fluid is discharged through the spray heads 32 for about 3 sec, at intervals of about 5 sec or longer between fills, generally as determined by the time needed for the fluid to reach a desired temperature, such as 80–100° C. The temperature of later discharges in the sequence may be less than that of the initial and other earlier discharges. Further preferably, wipers 44 are operated in cooperation with the discharge of fluid from apparatus 20, so that the wipers 44 go on only during and shortly after the fluid discharge. Optionally, wiper operation may be delayed, so that the wipers do not operate during the initial discharge, when ice 26 has not yet melted, but only start from the second and subsequent discharges.

After the sequence of discharges of heated fluid is completed, valve 66 is closed (relative to vessel 28), and drain valve 62 is preferably opened, so that any fluid remaining in the vessel can drain back into reservoir 30. Pump 40 is generally not sealed against back-flow. Accordingly a pressure relief valve 73 is preferably provided to relieve any fluid pressure build-up in such a case. Pressure relief valve 73 allows the fluid to flow back to reservoir 30 in the event of over-pressure. An upper end 61 of drain port 60 is preferably elevated relative to the bottom of chamber 52, so that a minimal amount of fluid will be left in vessel 28 even after draining. The vessel is then ready for rapid operation the next time apparatus 20 is actuated.

Bypass line 76 allows unheated fluid from reservoir 30 to be pumped directly to spray heads 32, without passing through vessel 28. Line 76 is open to spray heads 32 whenever a valve 74, preferably a three-way valve, is closed relative to outlet port 36. Line 76 can be used in warm weather, when de-icing is not needed, or when a cleaning spray is needed immediately, and there is not time to heat the fluid. Valve 74 preferably remains open relative to line 76, so that fluid from the line is conveyed to spray heads 32, whenever the heating apparatus is not actuated. A one-way valve 80 in line 76 preferably blocks any back-flow of fluid through the line.

Apparatus 20 thus provides additional window-cleaning functionality for automobile 22, at relatively low cost and without interfering with pre-existing window washing capabilities. The apparatus may either be installed as part of the window washing system in a new automobile, or it may easily be retrofitted into an existing washing system. Although the parts of apparatus 20 are shown in FIGS. 1 and 2 as being in certain positions and orientations relative to automobile 22 and the washing system therein, other positions and orientations are clearly possible. For example, vessel 28 may be placed at a different angle from the orientation shown in the figures, as long as ports 34, 36 and 60 are suitably positioned and oriented in the vessel.

Control of apparatus 20 by controller 46 is described hereinabove as being based on feedback to the controller provided by a sensor 64. This sensor is shown in FIG. 2 as being placed at the upper end of vessel 28, where it will measure the temperature either of vapor or fluid in chamber 52, depending on whether the chamber is empty or filled. Controller 46 preferably tracks and monitors changes in temperature sensed by sensor 64 during heat/fill/discharge cycles of vessel 28. If the temperature exceeds a predetermined maximum, or if temperature changes do not follow a predetermined normal profile, the controller will conclude that a malfunction has occurred, such as blockage of inlet 34 or outlet 36 or a failure of sensor 64, and will preferably interrupt operation of the apparatus and notify operator 25 by an appropriate signal.

In addition or alternative to sensor 64, there may be a temperature sensor 301 nearer the bottom of vessel 28, to measure the fluid temperature thereat, or a temperature sensor 302 mounted in, on or near heating element 50. Other sensors, such as a pressure sensor or pressure-stat or a fluid level sensor 303, may also be fixed in the vessel and provide feedback to controller 46. Further temperature sensors may also be used, including a sensor 82 on an outer surface of vessel 28, a sensor 84 in reservoir 30 for measuring the temperature of fluid therein, and a sensor 86 on an outer surface of automobile 22, most preferably on windshield 24. These sensors provide inputs to controller 46, which accordingly sets parameters such as the voltage applied to element 50 and/or the lengths of time for which the element and fluid in vessel 28 are heated.

Preferably, the controller sets the parameters so that the fluid is sprayed onto windshield 24 at a temperature high enough to melt ice 26 quickly under prevalent ambient conditions, as indicated by sensor 86, for example, but not so high (relative to the temperature of the windshield) as to create a danger of cracking the windshield or violating safety regulations in this regard. The selection of the parameters is preferably automatic, without requiring intervention by operator 25 of automobile 22, except to actuate or de-actuate apparatus 20 as desired.

The aforementioned description is that of the apparatus disclosed in PCT Application PCT/US98/13023. Improvements to this apparatus are now described, first with reference to FIG. 2.

In addition or alternative to sensor 64, a temperature sensor 304 is preferably mounted on or near each spray head 32. Temperature sensor 304 may additionally be mounted at a tee-connection 305 of the spray heads. Temperatures of the spray heads 32 are input to controller 46 and provide further feedback control for setting parameters such as the voltage applied to element 50 and/or the lengths of time for which the element and fluid in vessel 28 are heated.

During initial heating of vessel 28, there is generally a small quantity of fluid remaining therein, as mentioned hereinabove, and as shown in FIG. 2. It is seen that for such a small quantity of fluid, heating element 50 may not be submerged in the fluid, but rather may be exposed for most of its length to air inside vessel 28. In such a case, energizing heating element 50 may be wasteful, and worse, could cause damage from overheating. To solve this problem, an auxiliary heating element 306 is preferably disposed at the bottom of vessel 28. Heating element 306 may be shaped as a coil heater, for example, or any other suitable low-profile shape.

Heating element 306 is preferably connected to and controlled by controller 46, as is now described. If the amount of fluid in vessel 28 is sufficient to cover heating element 306 but not the majority of heating element 50, then it will take heating element 306 a relatively short time to heat fluid to a predetermined temperature, such as the boiling point. If, however, the amount of fluid in vessel 28 is sufficient to cover both heating elements 50 and 306, then it will take heating element 306 a longer time to heat fluid to the predetermined temperature. Temperature sensors 301 and 302, as well as fluid level sensors 303 and 309 or any other optional sensors mounted in vessel 28, may be used to monitor the time needed for the predetermined temperature rise, which time is processed by controller 46 to control heating of heating elements 50 and 306. For example, if the monitored time is relatively short, i.e., below a predetermined threshold, controller 46 interprets this to mean that the fluid covers only heating element 306, and thus only heating element 306 is energized and not heating element 50. If the time equals or exceeds the predetermined threshold, controller 46 interprets this to mean that the fluid sufficiently covers both heating elements 50 and 306, and thus both heating elements 50 and 306 are energized.

As mentioned above, control of apparatus 20 by controller 46 is described as being based on feedback to the controller provided by sensor 64. As an added safety feature, in the event of a failure in the control system, a thermoswitch 308, not connected to controller, may be provided at the upper end of vessel 28, which monitors the temperature either of vapor or fluid in chamber 52, depending on whether the chamber is empty or filled. If the temperature exceeds a predetermined maximum, thermoswitch 308 independently shuts down operation of the apparatus, even in the event of a failure in the electrical system of the vehicle or apparatus 20, and optionally, may notify operator 25 by an appropriate signal.

Figure 3:
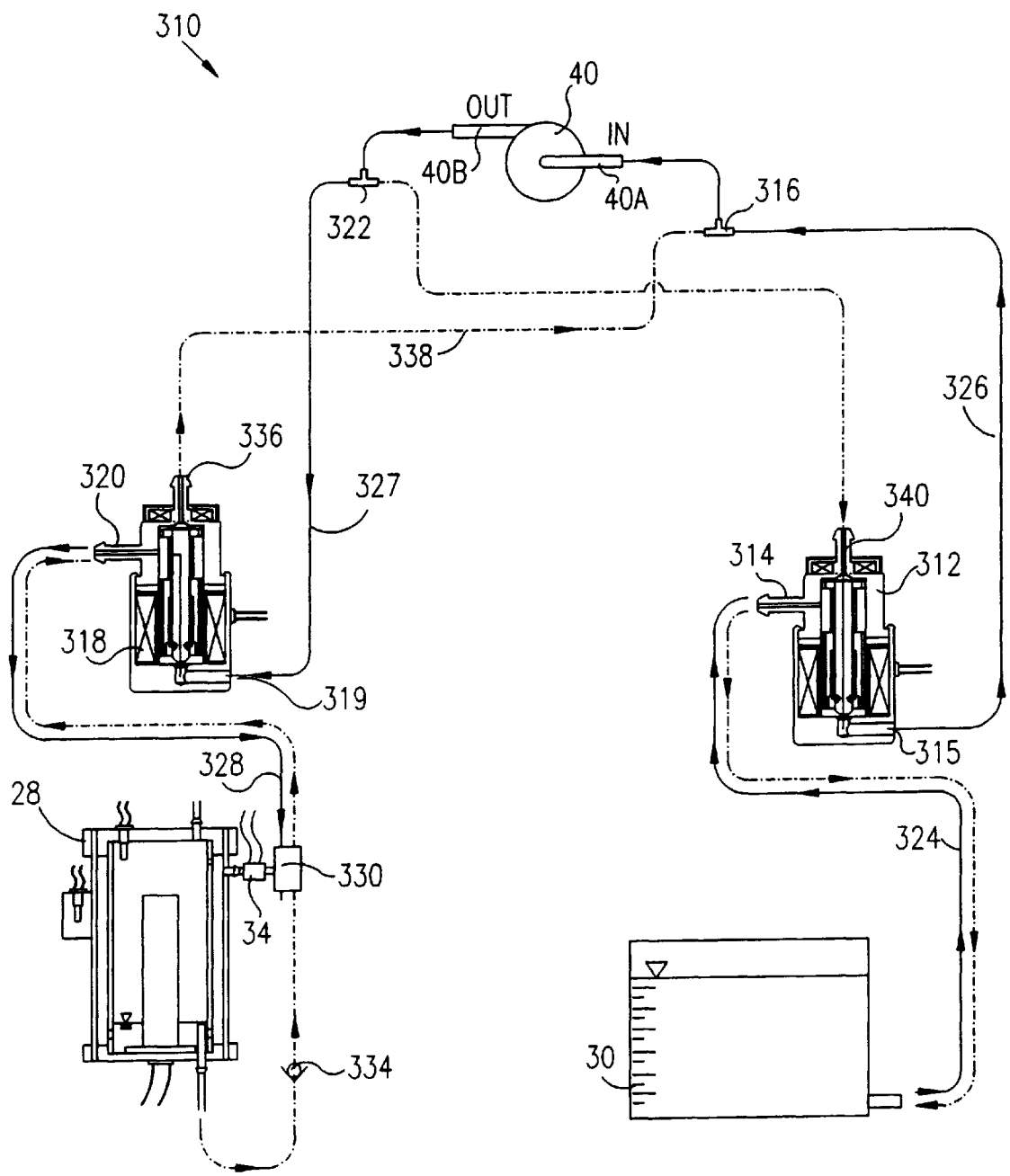
FIG. 3 is a simplified pictorial illustration of a filling and drainage pumping system useful in the window de-icing and cleaning apparatus of FIG. 2, constructed and operative in accordance with a preferred embodiment of the present invention.

Reference is now made to FIG. 3 which illustrates a filling and drainage pumping system 310 useful in window de-icing and cleaning apparatus 20, constructed and operative in accordance with a preferred embodiment of the present invention. In the embodiment of FIG. 3, system 310 preferably employs pump 40 described hereinabove. Pump 40 is preferably a centrifugal water pump which means it is an irreversible pump, i.e., fluid flows generally from an inlet 40A to an outlet 40B.

In accordance with a preferred embodiment of the present invention, a first solenoid 312 is in fluid communication between inlet 40A of pump 40 and reservoir 30. An interface port 314 of solenoid 312 is preferably connected to reservoir 30 via a fluid line 324 and an outlet port 315 is preferably connected to inlet 40A via a fluid line 326 and a tee-connector 316. Similarly, a second solenoid 318 is preferably in fluid communication between outlet 40B of pump 40 and vessel 28. An interface port 320 of solenoid 318 is preferably connected to inlet port 34 via a fluid line 328 and a tee-connector 330. Another port 319 of solenoid 318 is preferably connected to outlet 40B via a tee-connector 322 and a fluid line 327.

In the normally open position of solenoid 312, port 315 is open and a third port 340 is closed. Similarly, in the normally open position of solenoid 318, port 319 is open and a third port 336 is closed. Conversely, in the closed position of solenoid 312, port 315 is closed and third port 340 is open, and in the closed position of solenoid 318, port 319 is closed and third port 336 is open. Control of solenoids 312 and 318, as well as the other elements of system 310, is preferably accomplished by means of controller 46. In accordance with a preferred embodiment of the present invention, solenoids 312 and 318 may be constructed as shown and described hereinbelow with reference to FIGS. 19A and 19B.

Pumping system 310 is used to fill vessel 28 when the solenoids are preferably in the normally open position. Pump 40 is operated to draw fluid from reservoir 30 through fluid line 324 (in the direction of the solid line in FIG. 3) to solenoid 312. The fluid enters port 314 and flows out open port 315 through fluid line 326, past tee-connector 316 to inlet 40A of pump 40. It is noted that fluid does not flow from tee-connector 316 to solenoid 318 because port 336 is closed. The fluid flows from outlet 40B of pump 40 past tee-connector 322 via fluid line 327 to open port 319 of solenoid 318. Flow exits solenoid 318 via port 320 and fluid line 328 (in the direction of the solid line in FIG. 3) to tee-connector 330.

Vessel 28 is preferably equipped with a one-way valve 334 which permits fluid flow only out of drain port 60. Therefore, the fluid can only flow from tee-connector 330 to inlet port 34 which preferably comprises a valve (herein also referred to as a valve 34). Valve 34 is opened by controller 46, and the fluid fills vessel 28.

When it is desired to drain fluid from vessel 28, the solenoids are energized to be in the closed position. The pumping action of pump 40 causes fluid to be drained out of drain port 60 and to flow via one-way valve 334 to tee-connector 330. Valve 34 is closed by controller 46 so that the fluid is forced to flow in fluid line 328 (in the direction of the dashed line in FIG. 3) to port 320 of solenoid 318. Since port 319 is closed, fluid flows out of port 336 of solenoid 318 via a fluid line 338 to tee-connector 316 (in the direction of the dashed line in FIG. 3). Since port 315 of solenoid 312 is closed, the fluid can only flow from tee-connector 316 to inlet 40A of pump 40. The fluid exits outlet 40B of pump 40 and flows to tee-connector 322. Since port 319 of solenoid 318 is closed, the fluid can only flow from tee-connector 322 to port 340 of solenoid 312 (in the direction of the dashed line in FIG. 3). The fluid then exits port 314 of solenoid 312 back to reservoir 30 (in the direction of the dashed line in FIG. 3), and the drainage is complete.

Figure 4:
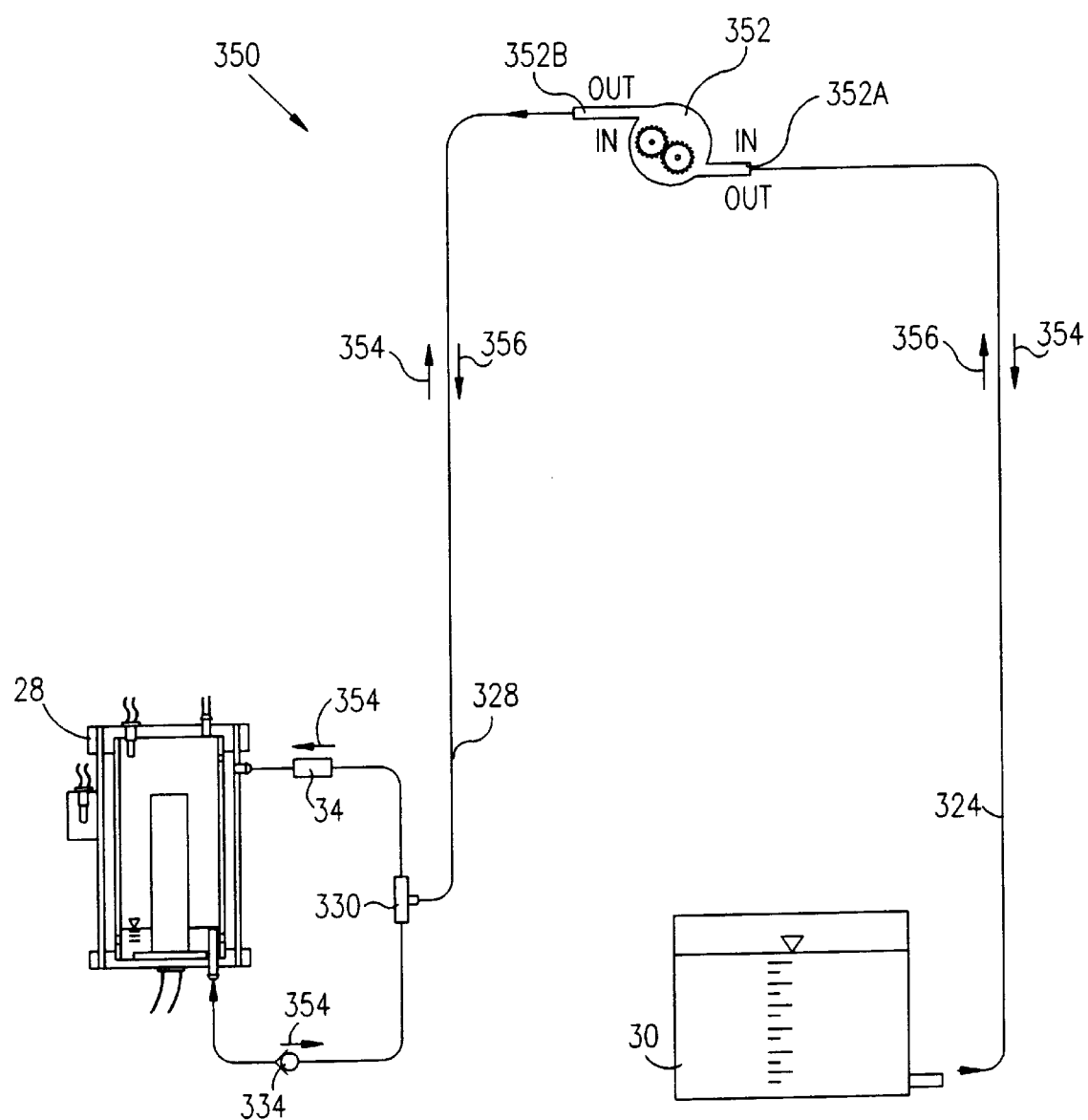
FIG. 4 is a simplified pictorial illustration of a filling and drainage pumping system useful in the window de-icing and cleaning apparatus of FIG. 2, constructed and operative in accordance with another preferred embodiment of the present invention.

Reference is now made to FIG. 4 which illustrates a filling and drainage pumping system 350 useful in window de-icing and cleaning apparatus 20, constructed and operative in accordance with another preferred embodiment of the present invention. Pumping system 350 is similarly constructed to pumping system 310, with like elements being designated by like numerals. (Pressure relief valve 73 and other elements are not shown for the sake of simplicity.) Pumping system 350 differs from system 310 in that system 350 preferably employs a reversible pump 352, such as a geared pump, i.e., fluid can flow both in and out of an first port 352A and a second port 352B. In addition, in pumping system 350 there is no need for solenoids.

When it is desired to fill vessel 28 with fluid, pump 352 is operated so that the fluid is pumped in the direction of arrows 356. The fluid flows from reservoir 30 via fluid line 324 through pump 352, thence via fluid line 328 to tee-connector 330, finally entering and filling vessel 28 via open valve 34, since the fluid cannot flow past one-way valve 334.

When it is desired to drain fluid from vessel 28, the pumping direction of pump 352 is reversed so that pump 352 now pumps fluid in the direction of arrows 354. Fluid is drained out of drain port 60 and flows via one-way valve 334 to tee-connector 330. Valve 34 is closed so that the fluid is forced to flow in fluid line 328 back to pump 352, thence to reservoir 30, and the drainage is complete.

Figure 5:
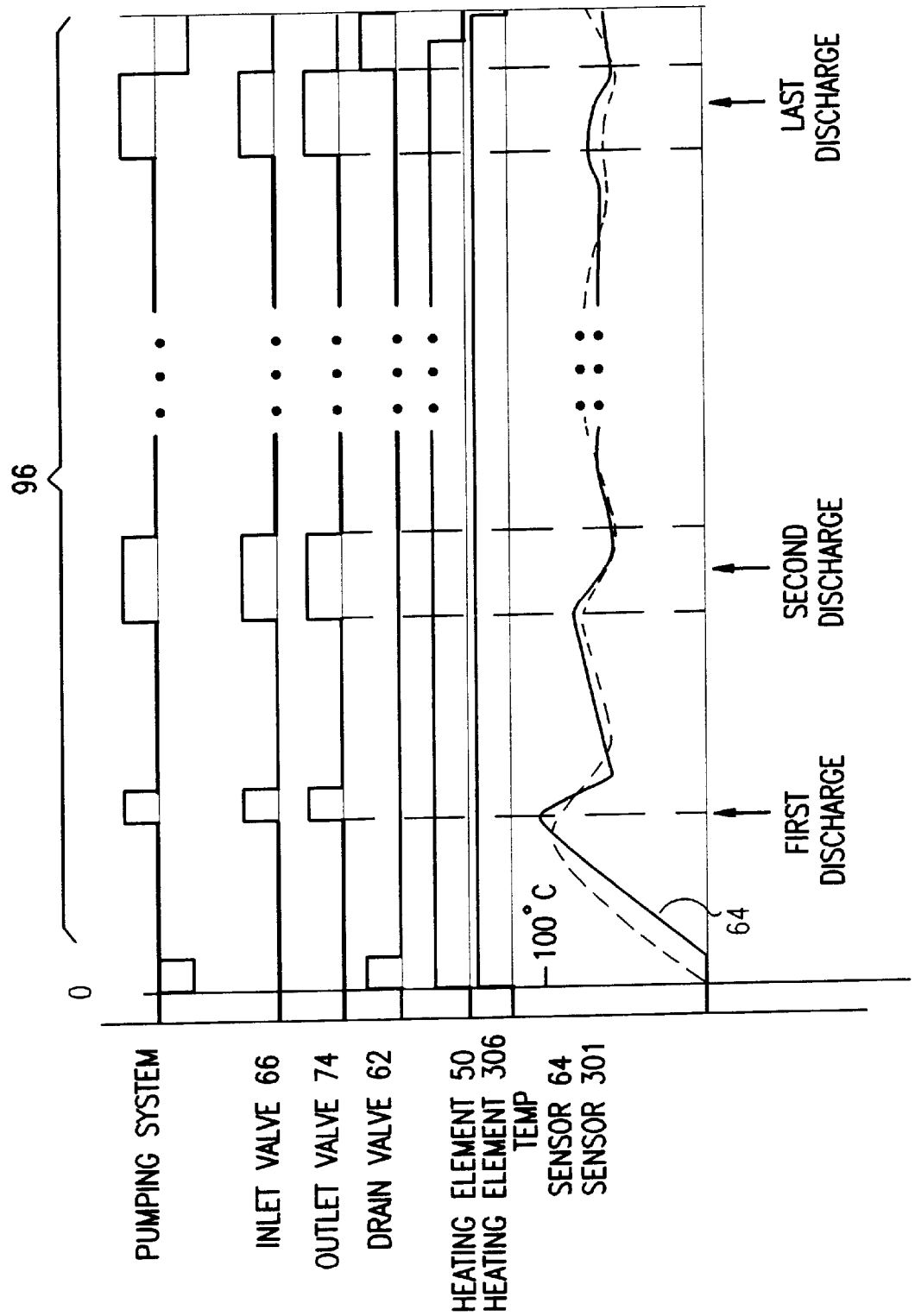
FIG. 5 is a timing diagram illustrating operation of the apparatus of FIG. 1, in accordance with a preferred embodiment of the present invention.

Reference is now made to FIG. 5 which is a timing diagram illustrating a sequence 96 of heat/fill/discharge cycles of apparatus 20, in accordance with a preferred embodiment of the present invention. The pumping system used may be the reversible pumping system of FIG. 4. In such a case, the pumping system may pump fluid towards vessel 28 (indicated by a positive ordinate in the graph) or it may drain fluid from vessel 28 (indicated by a negative ordinate in the graph). It is noted that pump 352 may be actuated intermittently when needed, or alternatively, pump 352 may be actuated continuously and controller 46 may be used to switch pump 352 between filling mode or draining mode as desired.

Initially, as described hereinabove, drain valve 62 is opened and heating element 306 and/or heating element 50 are energized to pre-heat vessel 28. Valve 62 is closed, preferably after about 15 sec. Alternatively, the drain valve may be held closed for a short period, preferably about 20 sec, so that the fluid in vessel 28 is heated to a high temperature before the valve is opened. This alternative is particularly useful if controller 46 determines that one of the valves, particularly inlet valve 66, is stuck and will not open, in which case the heated fluid is used to force the valve open.

Heating continues until sensors 64 or 301 reaches a target temperature, preferably about 85° C. (dependent on the exact position of the sensor), in chamber 52, or for about 70 sec, if the temperature does not reach the target temperature. At that point, pump 40 and inlet and outlet valves 66 and 74 open, to admit and discharge the initial quantity of fluid. The temperature in chamber 52 drops, and is subsequently reheated, preferably to about 60° C., whereupon a second quantity of the fluid is admitted and discharged. The process of reheating, fill and discharge continues for a predetermined number of cycles, or until terminated by operator 25.

After the final discharge in sequence 96, drain valve 62 is opened, and heating elements 50 and/or 306, which are energized substantially continuously throughout the sequence, remain energized for about 15 sec more, in order to heat and drive out of vessel 28 as much as possible of any fluid remaining therein, down to the level of upper end 61. The apparatus is then ready to begin the next sequence, when required by the user. Most preferably, as seen in FIG. 5, heating element 306 is first energized before heating element 50, there preferably being a delay of about 2–10 sec before energization of heating element 50. Similarly, most preferably, heating element 50 is turned off at the end of the cycle before heating element 306. The delays at the beginning and end of the cycles between heating elements 50 and 306 are preferably part of the working cycle so as to prevent overheating of heating element 50 and to ensure proper initial heating of the quantity of fluid left in the bottom of vessel 28.

Figure 6:
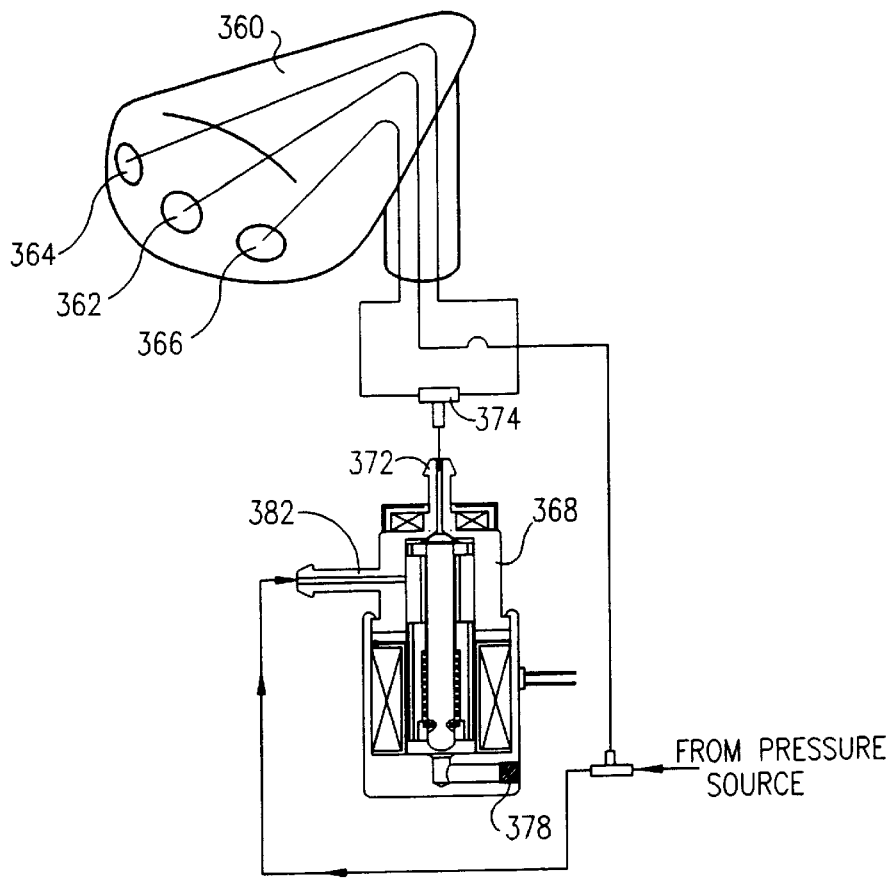
FIG. 6 is a simplified pictorial illustration of a multi-outlet spray head constructed and operative in accordance with a preferred embodiment of the present invention.

Reference is now made to FIG. 6 which illustrates a multi-outlet spray head 360 constructed and operative in accordance with a preferred embodiment of the present invention. Multi-outlet spray head 360 preferably includes a plurality of outlets, such as a central outlet 362 and two outer outlets 364 and 366, although any number of outlets may also be employed. In the embodiment of FIG. 6, the outlets are fed fluid preferably via a solenoid 368. Solenoid 368 has an inlet 382 into which fluid can flow from a pressurized fluid source. The fluid preferably exits solenoid 368 from an outlet 372 via a tee-connector 374 to spray head outlets 364 and 366. Fluid is preferably fed directly from the pressurized fluid source via a tee-connection to central outlet 362.

In the normally open position of solenoid 368, port 372 is open and a third port 378 is closed. Conversely, in the closed position of solenoid 368, port 372 is closed and third port 378 is open. However, in the embodiment of FIG. 6, third outlet 378 is plugged and not in use.

In the embodiment of FIG. 6, the flow of fluid from spray head 360 can be controlled, such as by means of controller 46, to spray out of the outlets in a variety of manners. For example, controller 46 can energize solenoid 368 to a closed position such that the fluid initially exits central outlet 362 only, with no fluid initially exiting outlets 364 and 366. After some initial delay, solenoid 368 can be opened so that the fluid exits outlets 364 and 366, the fluid exiting these two outlets substantially simultaneously. Controller 46 can then continue spraying from outlet 362, as well as outlets 364 and 366, or can cause any kind of combination of intermittent and continuous spraying from the three outlets. It is noted that in the embodiment of FIG. 6, outlets 364 and 366 always spray together.

Figure 7:
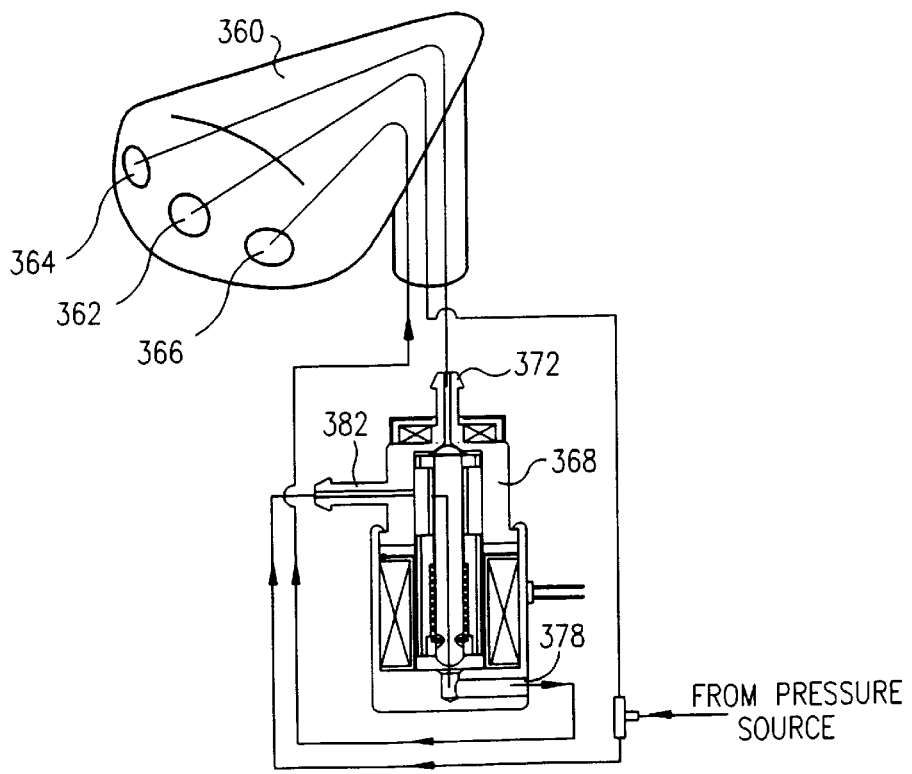
FIG. 7 is a simplified pictorial illustration of a multi-outlet spray head constructed and operative in accordance with another preferred embodiment of the present invention.

Reference is now made to FIG. 7 which illustrates a multi-outlet spray head 360 constructed and operative in accordance with another preferred embodiment of the present invention, in which there is no tee-connector 374. Port 372 feeds spray head outlet 364 and third port 378 feeds spray head outlet 366.

In the embodiment of FIG. 7, the flow of fluid from spray head 360 can be controlled, such as by means of controller 46, to spray out of the outlets in a variety of manners. For example, controller 46 can close solenoid 368 such that the fluid initially exits central outlet 362 and outlet 366, with no fluid exiting outlet 364. After some initial delay, solenoid 368 can be opened so that the fluid exits central outlet 362 and outlet 364, with no fluid exiting outlet 366. It is also possible to place solenoid 368 in a partially open position wherein fluid can exit both outlets 364 and 366, as well as central outlet 362. The difference between the embodiments shown in FIGS. 6 and 7 is that in the embodiment of FIG. 6, outlets 364 and 366 always spray together, whereas in the embodiment of FIG. 7, outlets 364 and 366 spray independently of each other. It is thus appreciated that in general a greater variety of spray patterns are possible with the embodiment of FIG. 7 than with the embodiment of FIG. 6.

Figure 8:
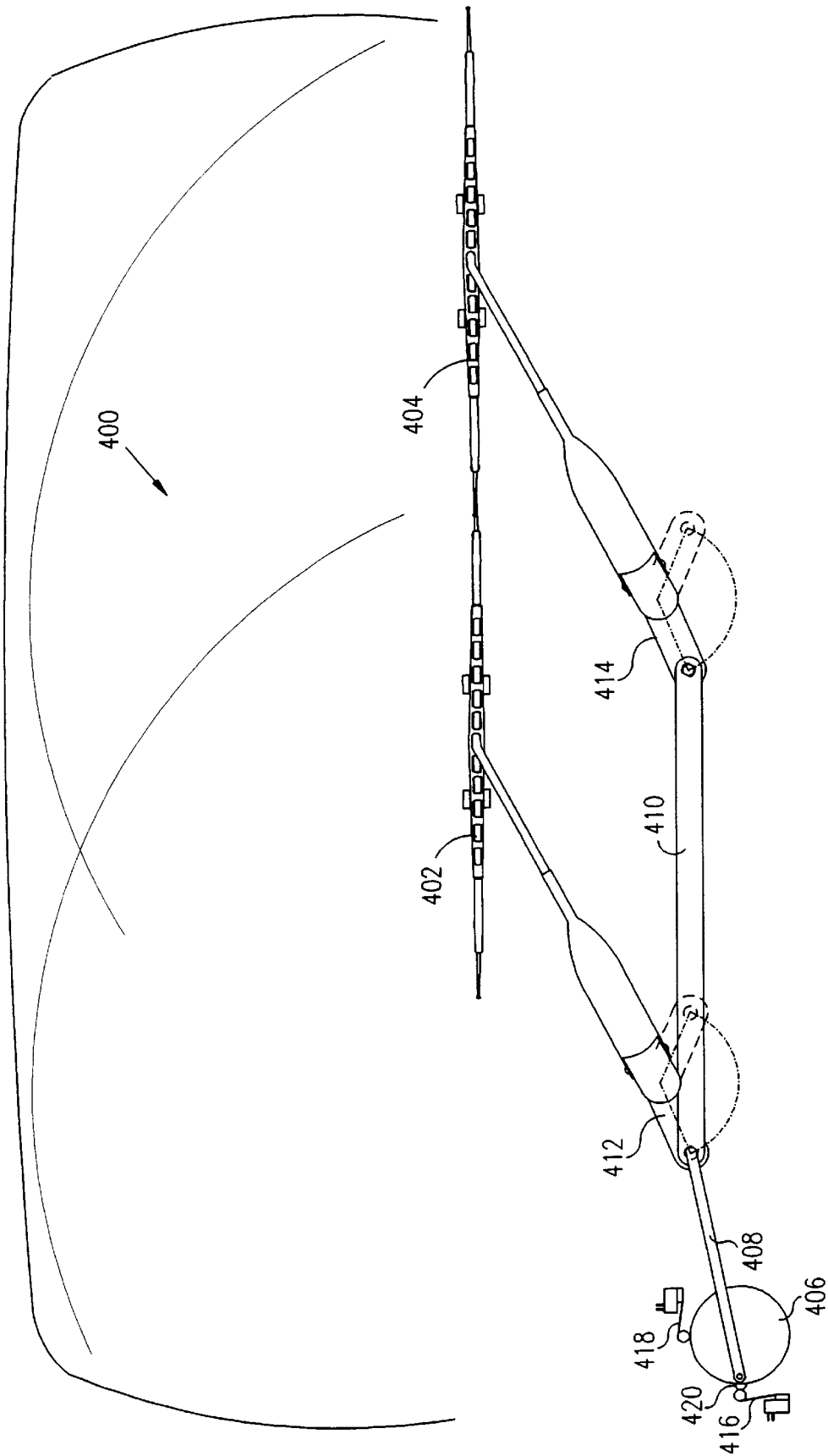
Figure 9:
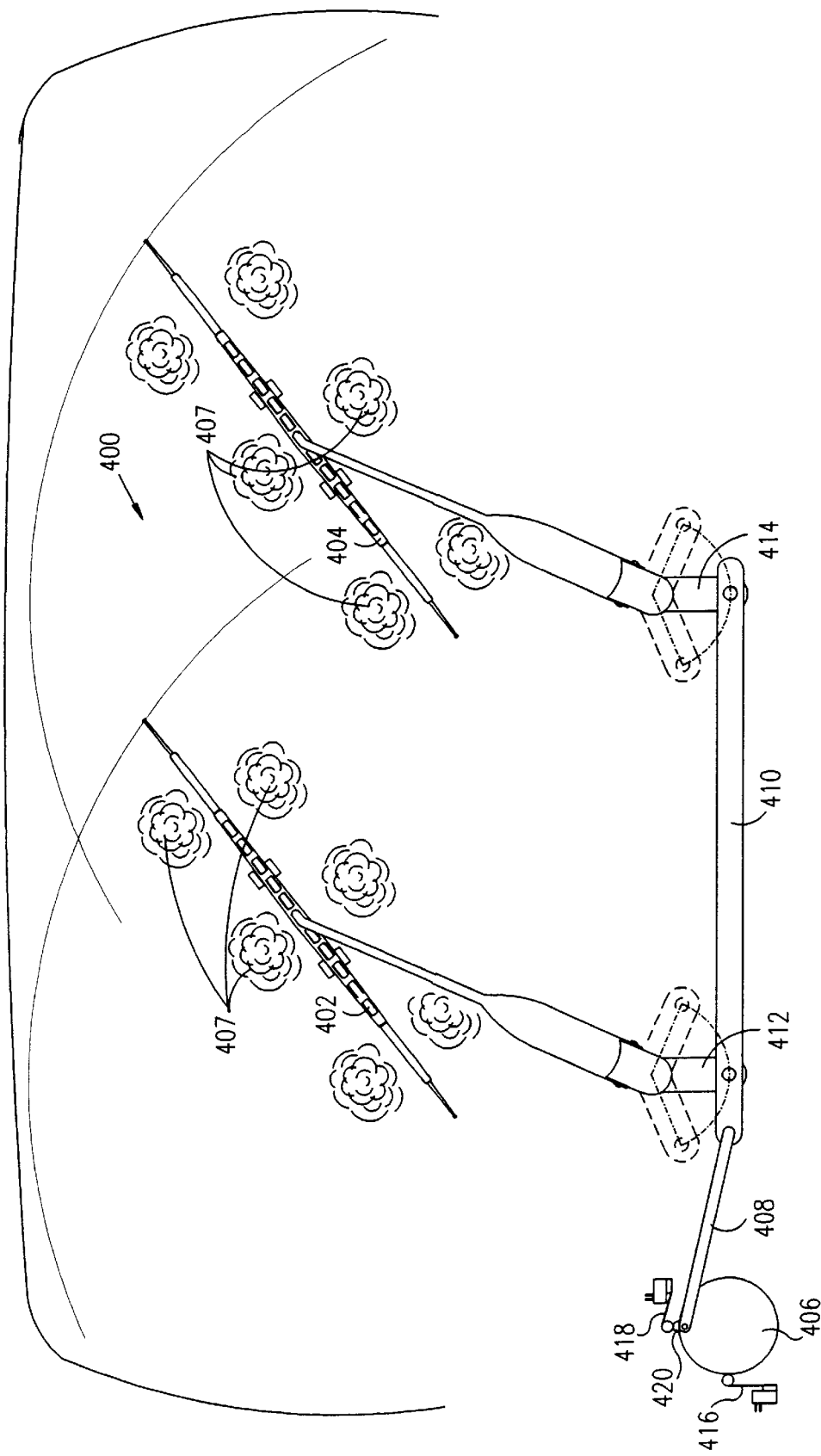

Reference is now made to FIGS. 8 and 9 which illustrate a windshield wiper actuator system 400 constructed and operative in accordance with a preferred embodiment of the present invention. Windshield wiper actuator system 400 is capable of placing windshield wipers 402 and 404 in either summer parking mode (FIG. 8) or winter parking mode (FIG. 9).

Windshield wiper actuator system 400 preferably includes a motor 406 which is connected to the wipers by means of a bar 408 which is pivotally attached to a linkage arm 410 which is in turn pivotally connected by means of linkage members 412 and 414 to wipers 402 and 404, respectively. The limits of travel of linkage members 412 and 414 are shown in phantom lines in FIGS. 8 and 9. It is seen that preferably sensors are provided for sensing the limits of the travel. For example, in the illustrated embodiment, a pair of microswitches 416 and 418 are provided. In the summer parking mode, the wipers 402 and 404 are brought to a horizontal or near horizontal position and a contact 420 of motor 406 actuates microswitch 416. In the winter parking mode, the wipers 402 and 404 are brought to a non-horizontal position, possibly even a vertical position, and contact 420 actuates microswitch 418. It is appreciated that other sensors may be used instead of microswitches, such as Hall effect sensors, to sense the limits of travel.

In the summer parking mode the wipers are at rest in a horizontal or near horizontal position, since in the summer there is generally no ice. However, in the winter, if there is a build-up of ice, the wipers may become stuck to the windshield, or even if not, the build-up of ice may prevent movement of the wipers. If the wipers were to be initially in a horizontal position, at the beginning of de-icing the wipers would start to move only at the bottom portion of the windshield, and the initially cleared area of the windshield would still not provide a convenient viewing area for safe driving. The driver would have to wait until the de-icing apparatus had melted a sufficient amount of ice for the wipers to be able to swing up to clear a visible swath on the windshield for safe driving. By bringing the wipers to the non-horizontal winter parking mode, the initially cleared area of the windshield, at the beginning of the de-icing process, already provides a convenient viewing area for safe driving.

It is noted that in FIG. 9 washer fluid (reference numeral 407) is discharged from wipers 402 and 404 themselves, such an embodiment being shown and described hereinbelow with reference to FIGS. 13 and 14.

Figure 10:
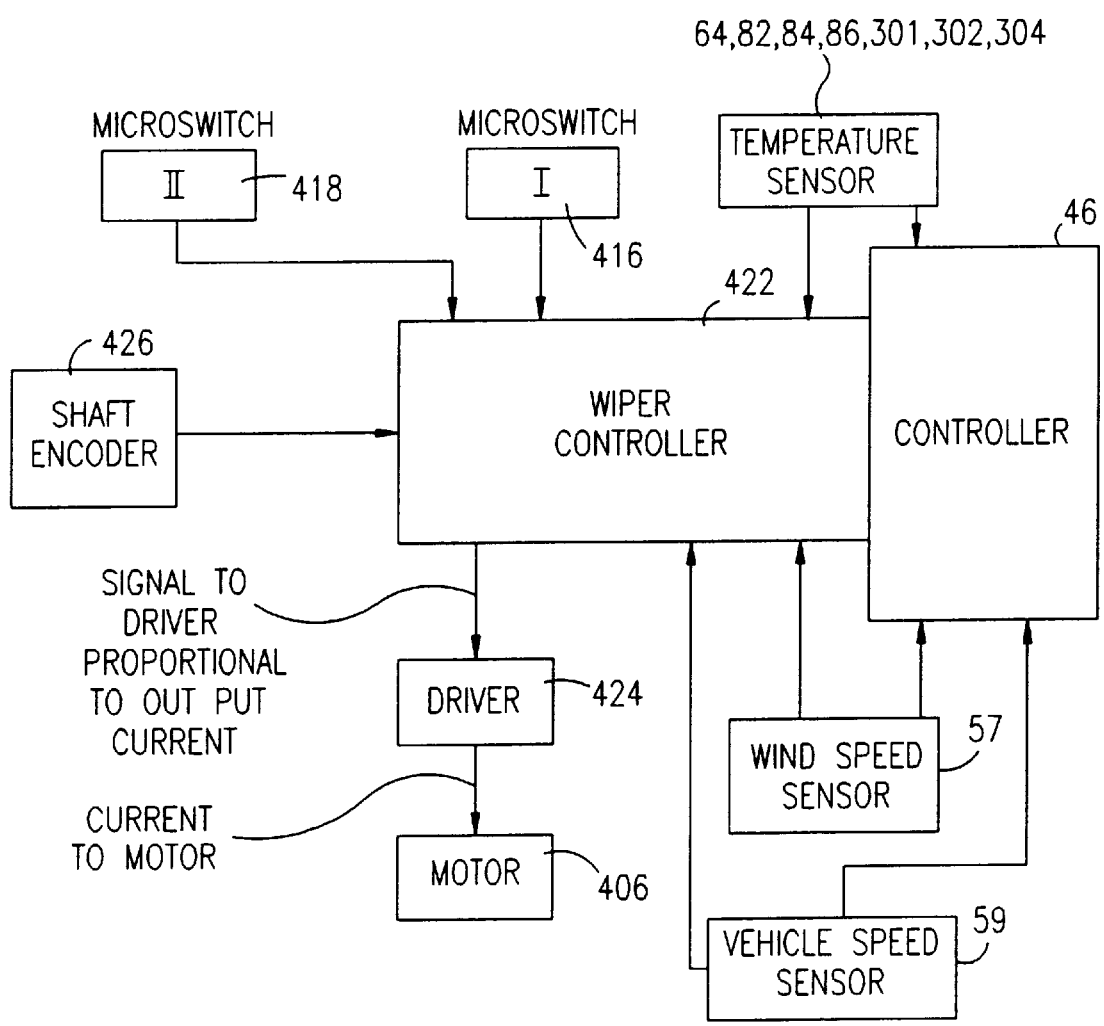
FIG. 10 is a simplified block diagram of the windshield wiper actuator system of FIGS. 8 and 9.

Reference is now made to FIG. 10 which illustrates a simplified block diagram of windshield wiper actuator system 400. Motor 406 is preferably controlled by a wiper controller 422 which preferably drives motor 406 via a power driver 424. Microswitches 416 and 418 are preferably in electrical communication with controller 422. Temperature sensors 64 or 304 are preferably in electrical communication with controller 422 as well. A shaft encoder 426 is preferably provided that can sense the rotation of motor 406 and thus the rotation of the wipers as well. Shaft encoder 426 can also counts the number of pulses of motor 406 during operation of the wipers, the importance of which will be described further hereinbelow.

Another example of sensors which may provide data to controller 46 in order to control heating of heating elements 50 and 306, are a wind speed sensor 57 and a vehicle speed sensor 59, the latter preferably being the standard speed sensor used with the speedometer of the vehicle. Wind can cool the fluid before it reaches the windshield. Accordingly, controller 46 can correlate the wind speed in terms of thermal effect on the fluid temperature and compensate therefor by heating the fluid to a higher temperature before spraying on the windshield. Alternatively, if there is no appreciable wind, controller 46 can save electricity and heat the fluid to a slightly lower temperature.

The driver can bring windshield wiper actuator system 400 into winter parking mode manually. Alternatively, system 400 may be automatically actuated. For example, temperature sensors 64 or 304, or a temperature sensor on the outside of the vehicle, may be used to sense a drop in temperature during the night, and the sensed change in temperature is interpreted by controller 422 to bring the windshield wipers to winter parking mode.

As mentioned above, when there is a build-up of ice, the wipers may become stuck to the windshield, or even if not, the build-up of ice may prevent movement of the wipers. At this initial stage, motor 406 is called upon to produce a large amount of torque and may become overheated or damaged. Therefore, it is important to prevent such damage to motor 406. This can be accomplished in several ways. For example, shaft encoder 426 or the commutation of motor 406 can be used to count the number of pulses of motor 406 during operation of the wipers. Controller 422 can compare the number of pulses with a predetermined amount to interpret whether or not motor 406 is being overworked. If motor 406 is being overworked, then controller 422 can shut down operation of motor 406 to prevent damage thereto.

As another example, since the electrical signal from controller 422 to driver 424 is generally proportional to the current output from driver 424 to motor 426, an intolerable rise in the output current of driver 424 can be used to indicate overheating of motor 406. In such a case, of course, there is no need for shaft encoder 426.

As a further example, the actuation or non-actuation of microswitches 416 and 418 provides controllers 46 and 422 with an indication of the clockwise or counterclockwise movement of wipers 402 and 404. By simply sensing which microswitch is actuated before the other, controllers 46 and 422 can tell the direction of the wiper movement. Even for small movements of the wipers, wherein only one microswitch may be actuated, controllers 46 and 422 can still sense the direction of movement of the wipers. The number of times the particular microswitch is actuated, or alternatively, the number of pulses of motor 406 can indicate the movement of the wipers. In addition, microswitches 416 and 418 can be used to monitor any possible overloading of motor 406, without any need for shaft encoder 426 or even driver 424. For example, contact 420 of motor 406 may be in initial contact with microswitch 416. If there is no obstruction to movement of the wipers, motor 406 will start to rotate and microswitch 416 will be released. If however there is an obstruction to movement of the wipers, motor 406 will stall somewhat and microswitch 416 will not be released. Controller 422 can then interpret the release or non-release of microswitch 416 to detect and prevent overheating of motor 406.

Reference is now made to FIGS. 11A–11F which illustrate a typical operating sequence of windshield wiper actuator system 400 in accordance with a preferred embodiment of the present invention. In the description that follows, the fluid is sprayed from spray head 360 (FIG. 7), but it is appreciated that other spray heads could also be used.

Figure 11A:
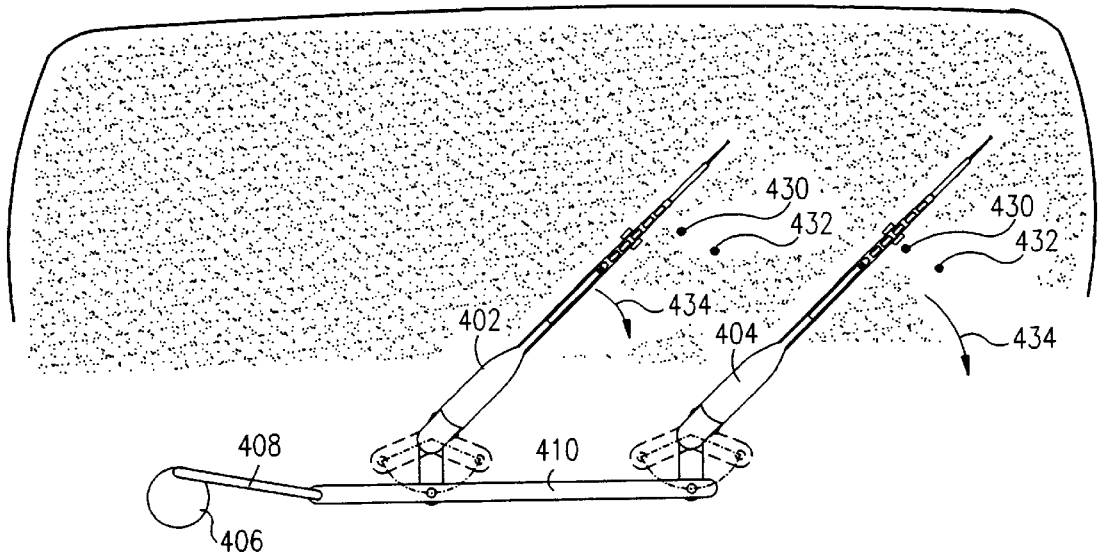
FIGS. 11A–11F are simplified illustrations of a typical operating sequence of the windshield wiper actuator system of FIGS. 8 and 9, in accordance with a preferred embodiment of the present invention.

In FIG. 11A, wipers 402 and 404 are in the winter parking mode and as such are positioned at some non-horizontal position. Central outlet 362 and outlet 364 of spray head 360 spray fluid at zones 430 and 432 in order to start melting ice accumulated on the windshield. Motor 406 tries to swing the wipers in a clockwise direction indicated by an arrow 434. The torque of motor 406 is measured for a predetermined period of time, such as 0.5 sec. If the torque reaches some predetermined value, controller 422 shuts down motor 406.

Figure 11B:
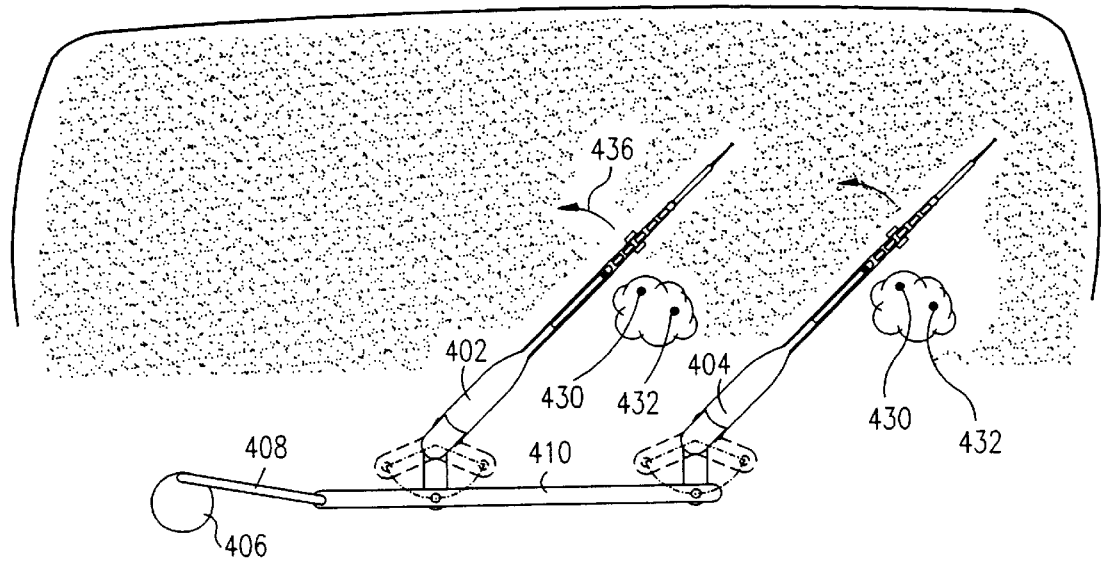

In FIG. 11B, central outlet 362 and outlet 364 of spray head 360 continue to spray fluid at zones 430 and 432. Motor 406 tries to swing the wipers in a counterclockwise direction indicated by an arrow 436. The torque of motor 406 is again measured for a predetermined period of time, and if the torque reaches some predetermined value, controller 422 shuts down motor 406.

Figure 11C:
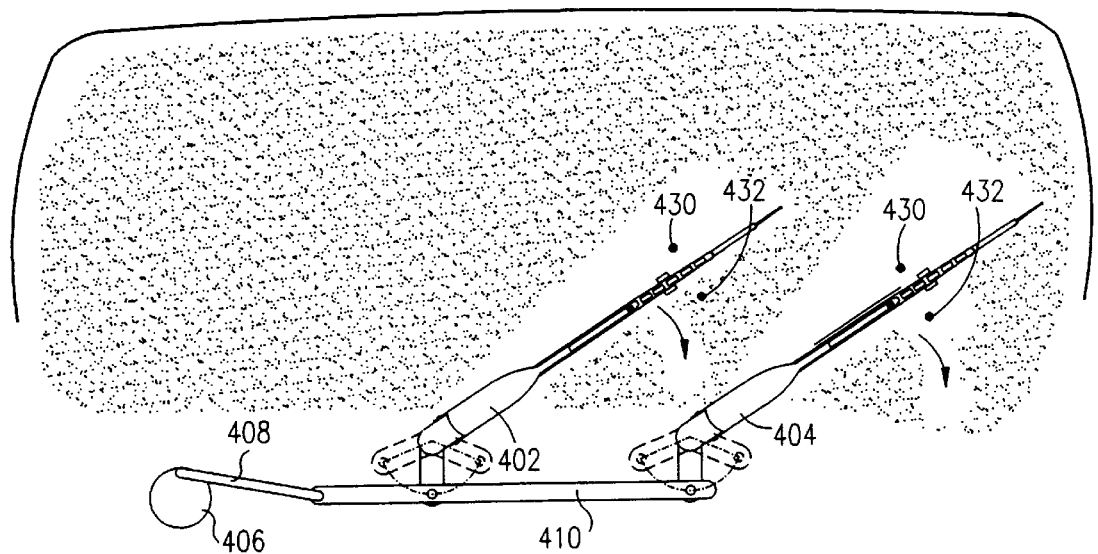

In FIG. 11C, central outlet 362 and outlet 364 of spray head 360 continue to spray fluid at zones 430 and 432. By this time, the fluid has succeeded in melting some of the ice. Motor 406 now succeeds in swinging the wipers both in clockwise and counterclockwise directions (arrows 434 and 436). When the torque of motor 406 reaches some predetermined level, controller 422 switches the swing direction of the wipers from clockwise to counterclockwise and vice versa.

Figure 11D:
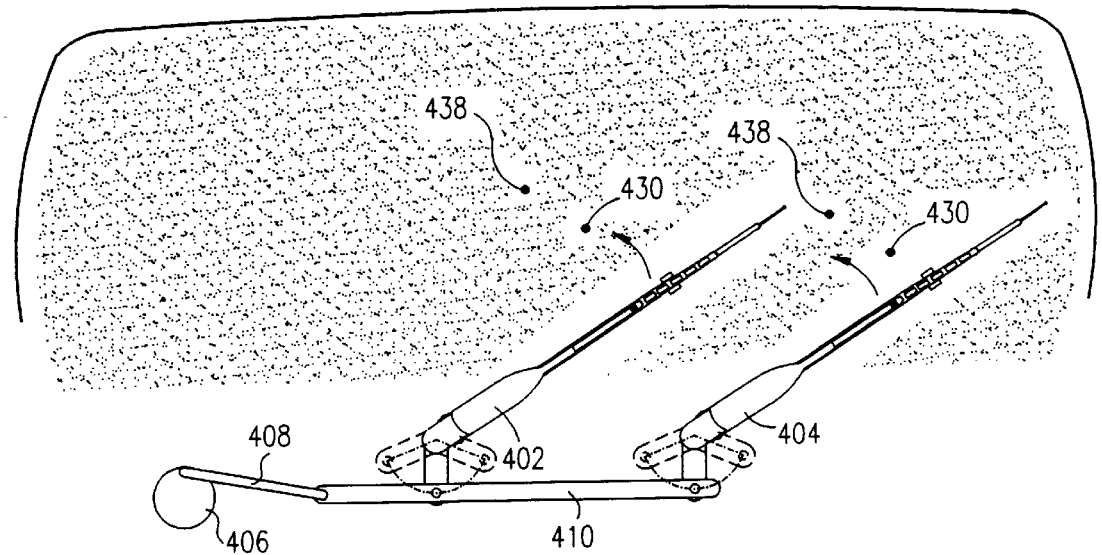

In FIG. 11D, outlet 366 starts to spray fluid at a zone 438, and outlet 364 is temporarily shut down. Central outlet 362 continues to spray fluid. Motor 406 now tries to swing the wipers in the counterclockwise direction so as to start cleaning a further swath on the windshield. It is appreciated that alternatively, outlet 364 may remain open to continue spraying fluid on the windshield. It is also appreciated that a variety of spray patterns may be employed in cleaning and de-icing the windshield and the abovementioned pattern is just one of these possibilities.

Figure 11E:
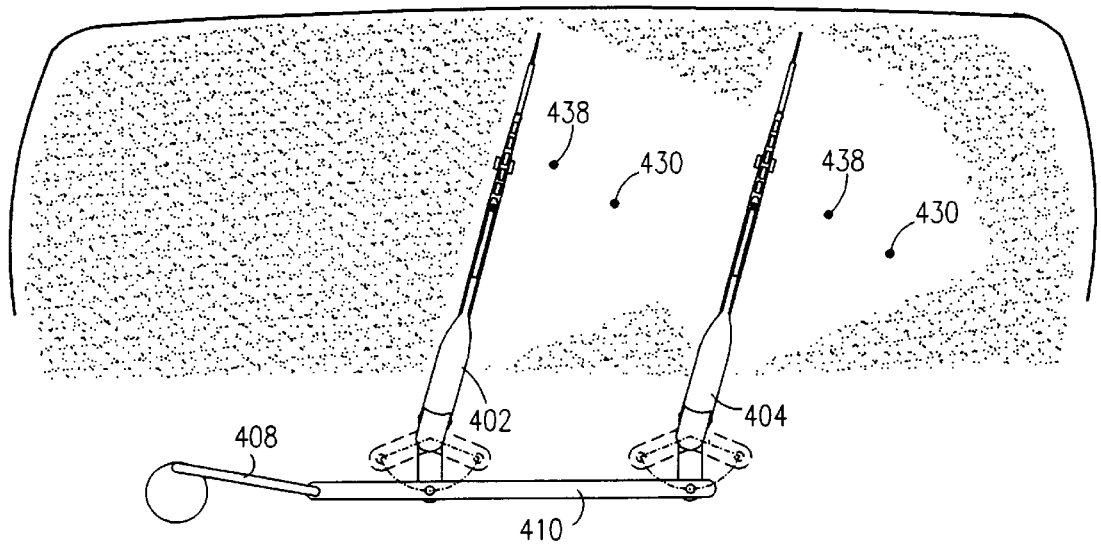
Figure 11F:
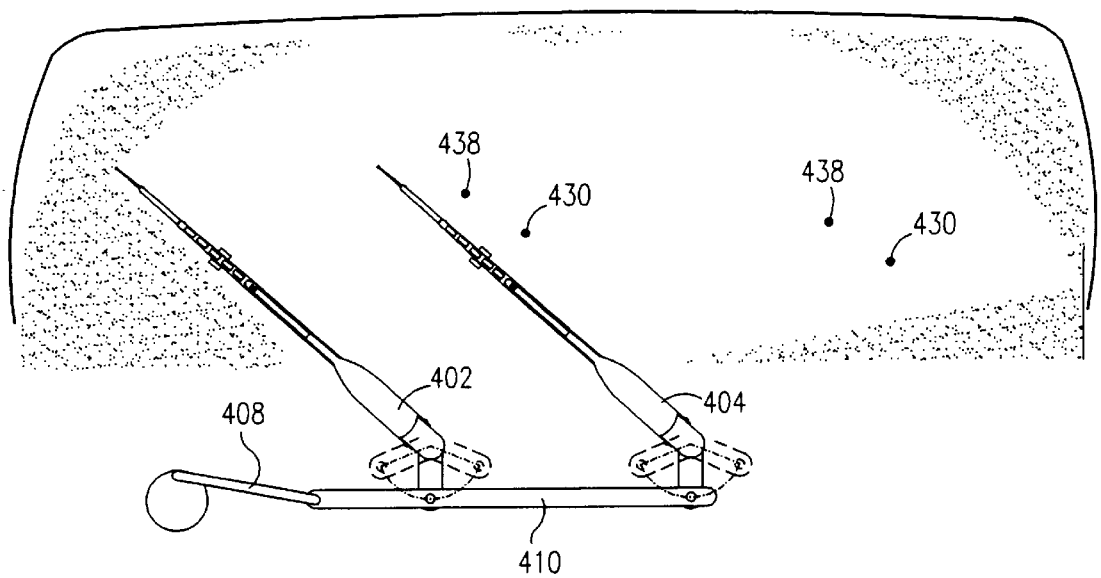

In FIG. 11E, the swath of the wipers has increased and more of the windshield is clean. In FIG. 11F, the fluid has succeeded in melting the ice and the wipers swing freely across the windshield.

Spray head 360 is preferably controlled by controller 46, as mentioned above. The control of the spray heads may be accomplished in any suitable manner, electronically or mechanically, for example. An example of a novel way of controlling the spray heads is now described.

Reference is now made to FIG. 12 which illustrates a cam system 440 for controlling spray head 360 during the operating sequence of windshield wiper actuator system 400, in accordance with a preferred embodiment of the present invention. In cam system 440, outlets 362, 364 and 366 are preferably regulated by individual valves 442, 444 and 446, respectively. The valves may be electronic valves or solenoids, for example. The valves are equipped with push rods 448, 450 and 452, respectively, which are actuated by a cam 454 attached to the wiper 402 or 404.

The cam surface of cam 454 is designed in accordance with a desired spray pattern. For example, as shown in FIG. 12, cam 454 may initially push down on rods 448 and 450 to actuate valves 442 and 444 to allow spraying from outlets 362 and 364, while initially rod 452 is not pushed down by cam 454 and thus outlet 366 is initially closed. As wiper 402 or 404 swings in the counterclockwise direction, cam 454 pushes down on rod 452 and opens outlet 366 for spraying therethrough, all the while outlets 362 and 364 remaining open. It is appreciated that a variety of spray patterns may be employed in cleaning and de-icing the windshield and the abovementioned pattern is just one of these possibilities.

Figure 13:
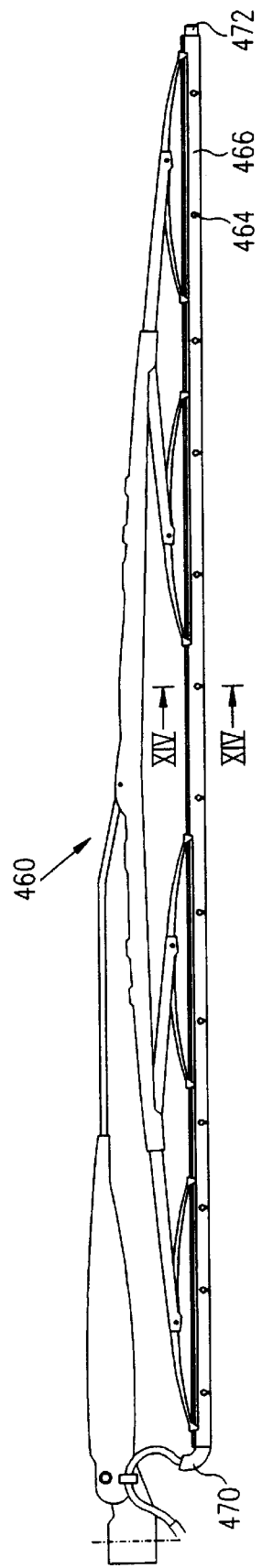
FIGS. 13 and 14 are simplified pictorial and sectional illustrations, respectively, of a windshield wiper constructed and operative in accordance with a preferred embodiment of the present invention, FIG. 14 being taken along lines XIV—XIV in FIG. 13.
Figure 14:
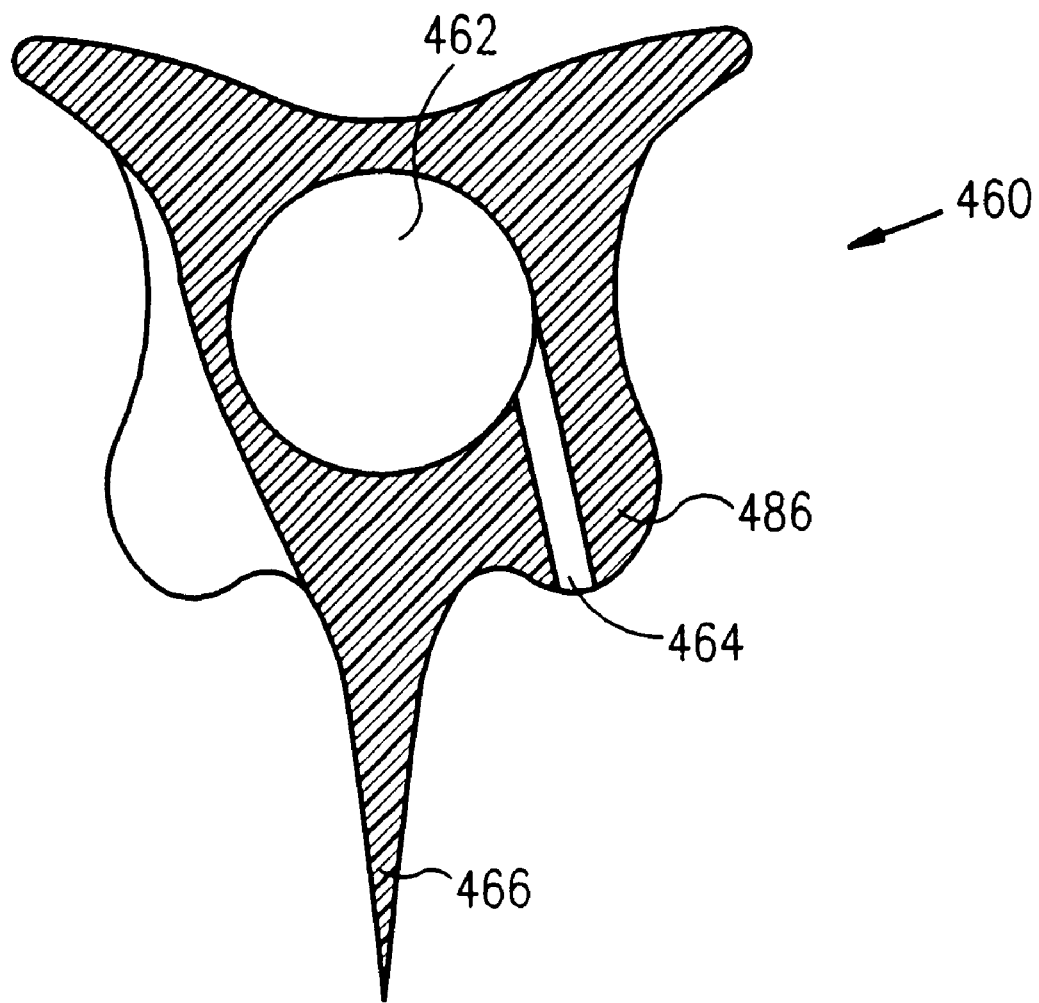

Reference is now made to FIGS. 13 and 14 which illustrate a windshield wiper 460 constructed and operative in accordance with a preferred embodiment of the present invention. Windshield wiper 460 preferably has a longitudinal bore 462 formed therethrough for flow of fluid therethrough. Bore 462 fluidly communicates with a plurality of outlet holes 464 for applying the fluid on a windshield. A blade 466 extends from a body 468 of wiper 460 for cleaning the windshield. Fluid preferably enters bore 462 at one end 470 of wiper 460, an opposite end 472 being substantially sealed.

Figure 15:
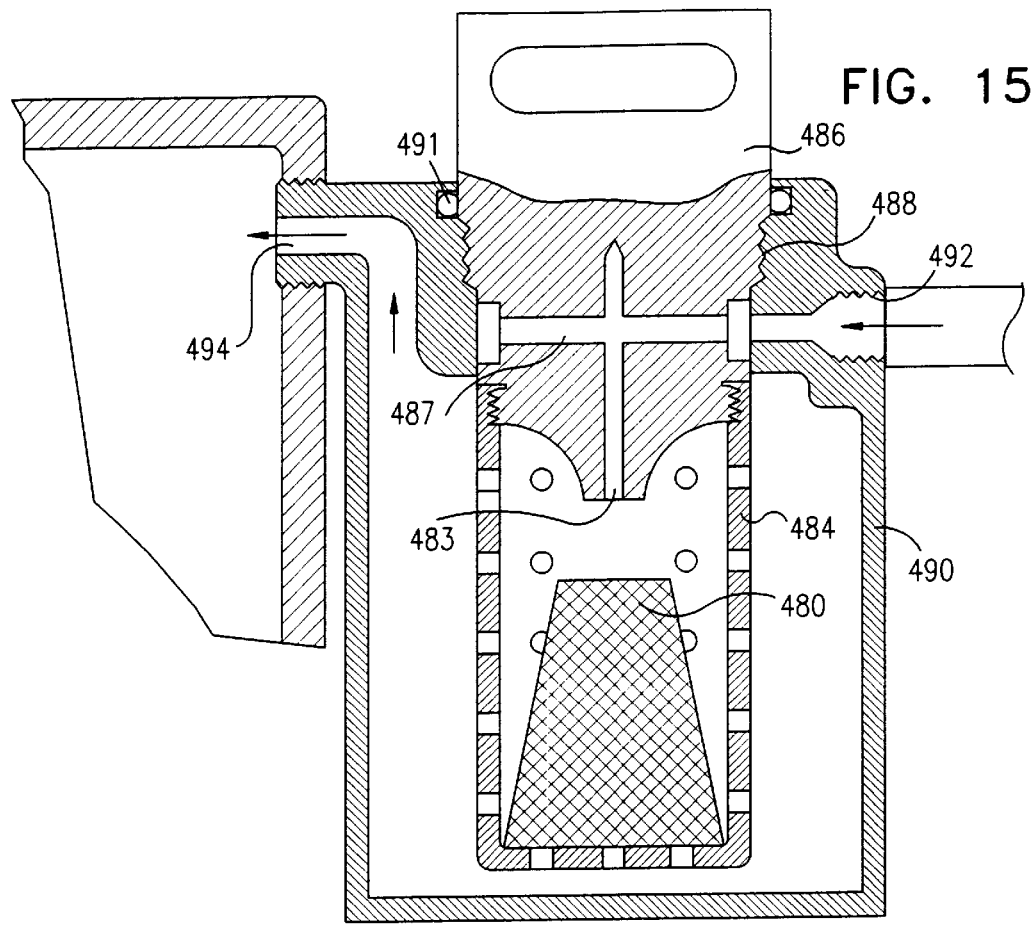
FIG. 15 is a simplified, partially sectional illustration of a cartridge containing an additive which can be added to the fluid used in the windshield wiper cleaning apparatus of FIG. 1, constructed in accordance with a preferred embodiment of the present invention, wherein the cartridge is installed in the system and the additive flows into solution with the fluid.
Figure 16:
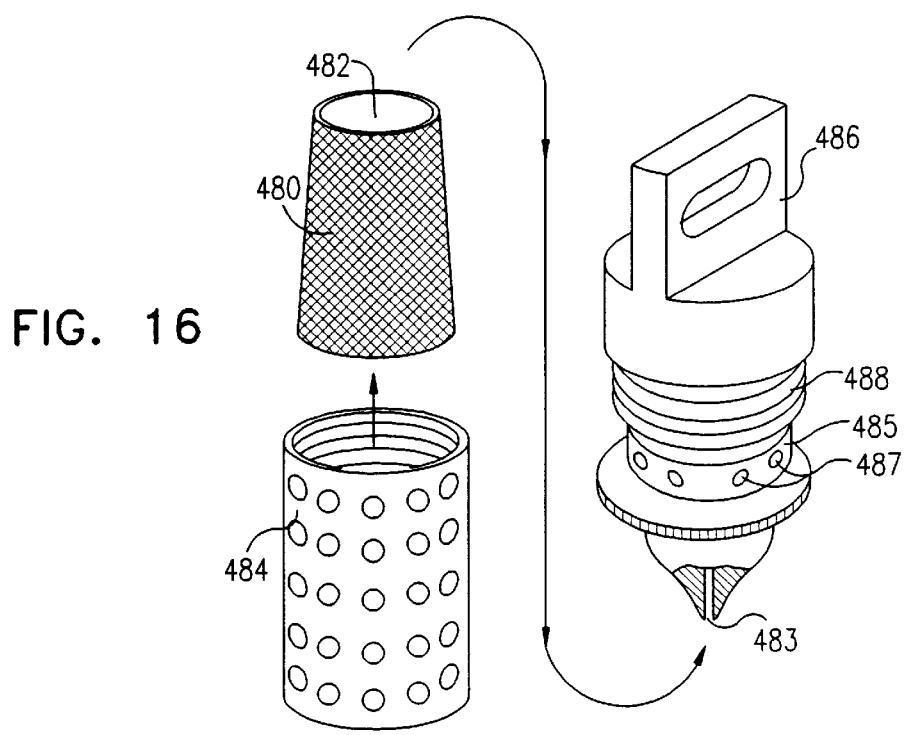
FIG. 16 is a simplified pictorial illustration of the cartridge of FIG. 15.

Reference is now made to FIGS. 15 and 16 which illustrate a cartridge 480 useful in the windshield wiper cleaning apparatus of the present invention, such as that of FIG. 1, constructed in accordance with a preferred embodiment of the present invention. The fluid used in the windshield wiper cleaning apparatus of the present invention is any kind of suitable windshield washer fluid, and as such may contain an additive such as anti-freeze, for example. Cartridge 480 is a convenient device for adding such an additive to the windshield washer fluid.

Referring to FIG. 16, cartridge 480 contains an additive 482. Cartridge 480 may be made of any kind of suitable material, such as plastic or metal, and additive 482 may be in liquid or solid form. In the case of solid form, cartridge 480 may itself be a solid block of additive. Cartridge 480 fits into an apertured holder 484 which is sealed by a plug 486. Plug 486 preferably sealingly snap fits into apertured holder 484 and is provided with a threaded neck 488. Below threaded neck 488 is a neck portion 485 formed with a plurality of through holes 487. Holes 487 are in fluid communication with a bore 483 which is in turn in fluid communication with apertured holder 484.

Figure 17:
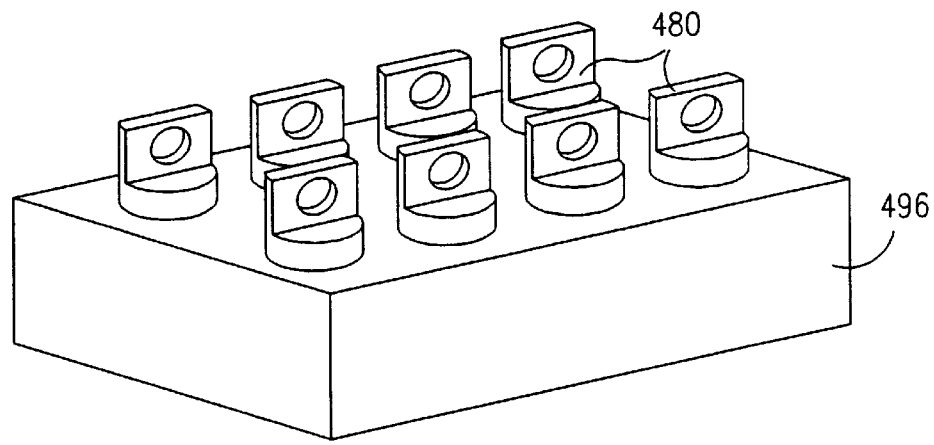
FIG. 17 is a simplified pictorial illustration of a carrier for a plurality of such cartridges.

Referring now to FIG. 15, it is seen that threaded neck 488 can be screwed into a container 490 and is preferably sealed by an O-ring 491. Container 490 has a fluid inlet 492 and a fluid outlet 494. Fluid may enter inlet 492, such as from reservoir 30 (FIG. 2) and flow through holes 487 and bore 483 into apertured holder 484. Cartridge 480 becomes submerged in the fluid and additive 482 is mixed with the fluid, such as by seeping, leaching, or dissolving, for example. The fluid with the additive 482 then exits via outlet 494 and flows into vessel 28. Referring now to FIG. 17, it is seen that a carrier 496 may be provided for convenient storage of a plurality of cartridges 480.

Figure 18:
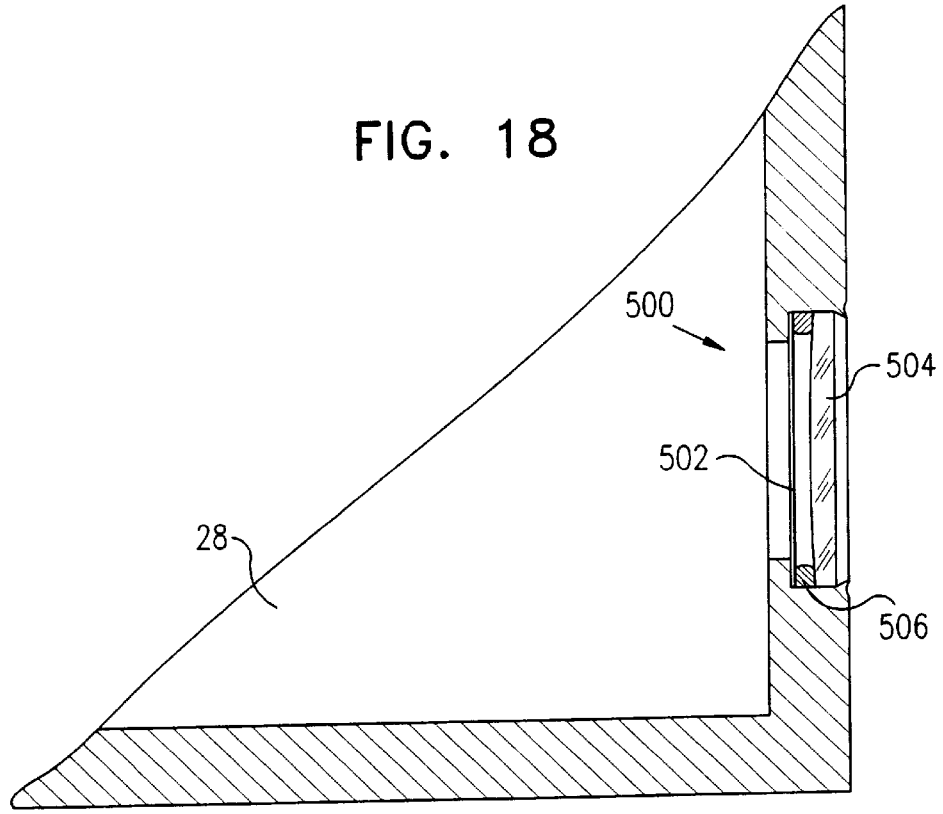
FIG. 18 is a simplified, partially sectional illustration of a fluid authorization system for verifying use of an authorized fluid in the windshield wiper cleaning apparatus of FIG. 1, constructed in accordance with a preferred embodiment of the present invention.

Reference is now made to FIG. 18 which illustrates a fluid authorization system 500 for verifying use of an authorized fluid in the windshield wiper cleaning apparatus of FIG. 1, constructed in accordance with a preferred embodiment of the present invention. Fluid authorization system 500 preferably includes a membrane 502 and a viewing window 504 both of which are preferably sealed by a seal 506, such as an O-ring, round or rectangular in shape, for example. Membrane 502 is preferably constructed of a material that disintegrates if it is not in the presence of a fluid authorized for use with the windshield wiper cleaning apparatus of the present invention. For example, additive 482 mixed with water may cause a chemical reaction which inhibits decomposition or disintegration of membrane 502. (One example would be a membrane which is decomposed in the presence of a basic solution and additive 482 changes the pH of the solution to neutral or acidic, thereby preventing the decomposition of the membrane.) If an authorized fluid is not used, then any disintegration of membrane 502 may be viewed through viewing window 504.

Figure 19A:
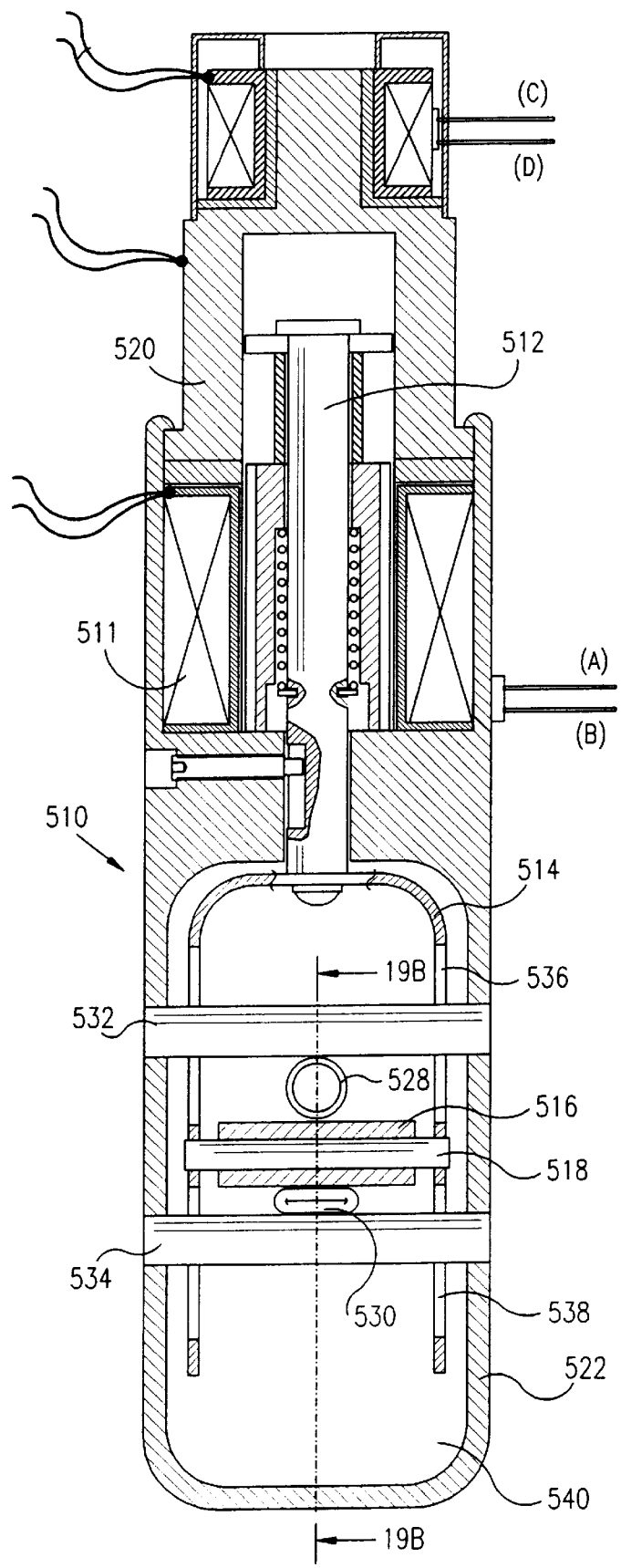
FIGS. 19A and 19B are simplified, partially sectional illustrations of a solenoid constructed in accordance with a preferred embodiment of the present invention, and useful in the windshield wiper cleaning apparatus of the present invention, FIG. 19B taken along lines 19B—19B in FIG. 19A.
Figure 19B:
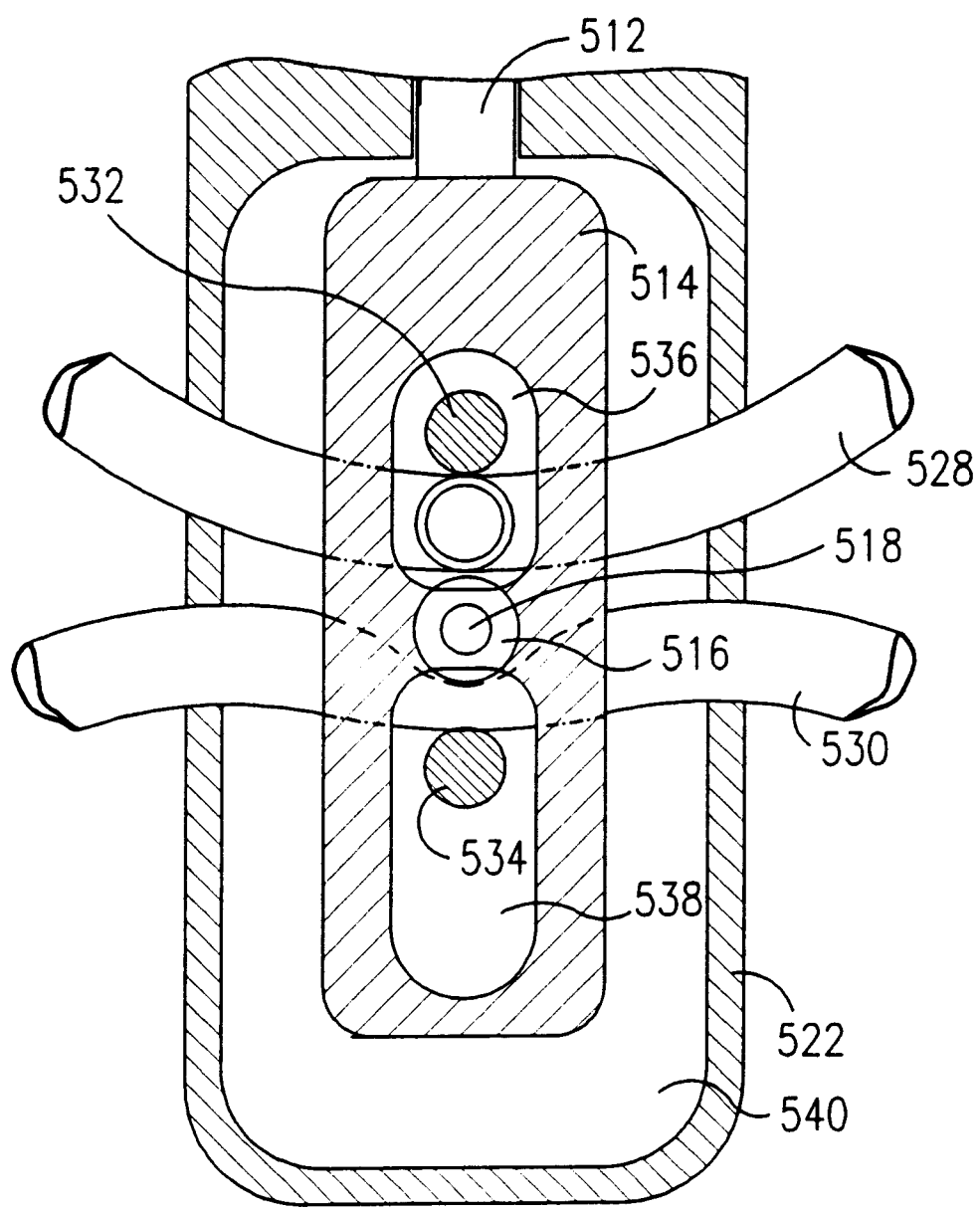

Reference is now made to FIGS. 19A and 19B which illustrate a solenoid 510 constructed in accordance with a preferred embodiment of the present invention, and useful in the windshield wiper cleaning apparatus of the present invention. Solenoid 510 preferably comprises a central shaft 512 at a distal end of which is secured a generally inverted U-shaped yoke 514. Electromagnetic apparatus 511 is provided for moving shaft 512 generally linearly. A rod 516 is preferably fixedly pinned to yoke 514 by a pin 518. Attached to a bottom portion of a body 520 of solenoid 510 is a tube receiving member 522. Tube receiving member 522 also preferably includes a pair of fixed rods 532 and 534 which pass through openings 536 and 538, respectively, formed in yoke 514. As seen in FIGS. 19A and 19B, a tube 528 is positioned between rod 516 of yoke 514 and fixed rod 532. A tube 530 is positioned between rod 516 of yoke 514 and fixed rod 534. Yoke 514 is disposed in a cavity 540 of tube receiving member 522. Tubes 528 and 530 are preferably made of a resilient material, such as rubber or neoprene. The resilient tubes springing back from the compressed state to the non-compressed state applies a force on shaft 512 and further aids in the generally linear travel of shaft 512, thereby realizing energy savings.

FIG. 19A illustrates a normally open position of solenoid 510. In this position, rod 516 squeezes tube 530, thereby substantially sealing tube 530 from passage therethrough of a fluid. Tube 530 (as well as tube 528) preferably have an elliptical cross section (or other suitable non-circular shape) to facilitate flattening thereof Synergistically, this shape also enables smaller distances of travel of central shaft 512 and larger forces applied by the solenoid to the tubes. In the normally open position, tube 528 is not squeezed, and fluid may pass therethrough.

Solenoid 510 can be energized to a closed position. In this position, rod 516 is brought upwards in the sense of FIGS. 19A and 19B, and now squeezes tube 528, thereby substantially sealing tube 528 from passage therethrough of a fluid. In the closed position, tube 530 is not squeezed, and fluid may pass therethrough. It is also possible to energize solenoid 510 to be in a partially open position wherein fluid can exit both tubes 528 and 530.

It is appreciated by persons skilled in the art that the structure of solenoid 510 may be suitably modified to seal and open just one tube or more than two tubes, if desired. It is also appreciated that the normally open position and closed positions may be reversed. In addition, the tubes can be connected by suitable connections, such as tee-connections.

It will be appreciated that the preferred embodiments described above are cited by way of example, and the full scope of the is limited only by the claims.

What is claimed is:

1. Apparatus for cleaning or de-icing a vehicle window, comprising:

a reservoir for containing therein a washing fluid;

a vessel having an inlet through which the washing fluid is received from the reservoir and an outlet through which the fluid is discharged for cleaning a vehicle window; and a first heating element disposed in the vessel for heating the fluid in the vessel;

characterized by an auxiliary heating element being disposed in the vessel for heating the fluid in the vessel, wherein said auxiliary heating element is disposed at a bottom portion of the vessel and is operative to heat a quantity of fluid which is not necessarily sufficient to cover the first heating element.

2. Apparatus according to claim 1 and further comprising a plurality of sensors which feed data concerning at least one of a temperature and a fluid level of the fluid in the vessel to a controller, said controller controlling energization of the first and auxiliary heating elements in response to the data.

3. Apparatus according to claim 1 and further comprising a temperature sensor mounted in said auxiliary heating element.

4. Apparatus for cleaning or de-icing a vehicle window, comprising:

a reservoir for containing therein a washing fluid;

a vessel having an inlet through which the washing fluid is received from the reservoir and an outlet through which the fluid is discharged;

a spray head in fluid communication with the outlet through which the fluid is sprayed onto a vehicle window; and a heating element disposed in the vessel for heating the fluid in said vessel;

characterized by a temperature sensor mounted in propinquity to said spray head, said temperature sensor being in communication with a controller which controls heating of said heating element in response to a temperature sensed by said temperature sensor.

5. Apparatus for cleaning or de-icing a vehicle window, comprising:

a reservoir for containing therein a washing fluid;

a vessel having an inlet through which the washing fluid is received from the reservoir and an outlet through which the fluid is discharged;

a spray head in fluid communication with the outlet through which the fluid is sprayed onto a vehicle window; and a heating element disposed in the vessel for heating the fluid in said vessel;

characterized by a wind speed sensor in communication with a controller, wherein said controller correlates a wind speed sensed by said wind speed sensor to a temperature of the fluid sprayed from the spray head, and controls heating of said heating element in response to the wind speed sensed by said wind speed sensor.

6. Apparatus according to claim 5 and further comprising a vehicle speed sensor, wherein said controller also correlates a vehicle speed sensed by said vehicle speed sensor to a temperature of the fluid sprayed from the spray head, and controls heating of said heating element in response to the vehicle speed sensed by said vehicle speed sensor.

7. Apparatus for cleaning or de-icing a vehicle window, comprising:

a reservoir for containing therein a washing fluid;

a vessel having an inlet through which the washing fluid is received from the reservoir and an outlet through which the fluid is discharged for cleaning a vehicle window; and a first heating element disposed in the vessel for heating the fluid in the vessel;

characterized by a pumping system in fluid communication with said reservoir and said vessel which selectively pumps fluid from said reservoir to said vessel and drains said fluid from said vessel back to said reservoir and wherein said pumping system comprises at least one solenoid in fluid communication with said reservoir and said vessel and switchable from a first position to a second position, wherein in said first position said at least one solenoid permits flow from said reservoir to said vessel and substantially prevents draining said fluid from said vessel back to said reservoir, and wherein in said second position said at least one solenoid permits draining said fluid from said vessel back to said reservoir and substantially prevents flow from said reservoir to said vessel.

8. Apparatus according to claim 7 and wherein said pumping system comprises a reversible pump which in a first operating orientation pumps said fluid from said reservoir to said vessel and in a second operating orientation pumps said fluid from said vessel back to said reservoir.

9. Apparatus according to claim 8 and wherein said reversible pump comprises a geared pump.

10. Apparatus for cleaning or de-icing a vehicle window, comprising:

a reservoir for containing therein a washing fluid;

a vessel having an inlet through which the washing fluid is received from the reservoir and an outlet through which the fluid is discharged;

a spray head in fluid communication with the outlet through which the fluid is sprayed onto a vehicle window;

a windshield wiper for wiping said window; and characterized by said spray head comprising a multi-outlet spray head that comprises a plurality of spray outlets and further comprising a controller which controls a spraying pattern of said plurality of outlets and further comprising a sensor for sensing an angular position of said windshield wiper, wherein said controller controls the spraying pattern of said plurality of outlets in accordance with the angular position of said windshield wiper.

11. Apparatus according to claim 10 and further comprising a cam mounted on the windshield wiper said cam selectively opening said outlets to permit flow of said fluid therethrough.

12. Apparatus according to claim 10 and further comprising a motor which actuates the windshield wiper and a sensor for sensing a torque of said motor, wherein said controller controls the spraying pattern of said plurality of outlets in accordance with the torque of said motor.

13. Apparatus according to claim 12, wherein said windshield wiper wipes said window between two limits of travel, and said windshield wiper is placeable in a summer parking mode and a winter parking mode, wherein in said summer parking mode, said wiper is at rest generally at one of the limits of travel, and wherein in said winter parking mode, said wiper is between said limits of travel.

14. Apparatus for cleaning or de-icing a vehicle window, comprising:

a reservoir for containing therein a washing fluid;

a vessel having an inlet through which the washing fluid is received from the reservoir and an outlet through which the fluid is discharged for cleaning a vehicle window; and characterized by further comprising a cartridge which dispenses an additive to the fluid prior to discharging the fluid.

15. Apparatus according to claim 14 and wherein said cartridge comprises a solid block of said additive.

16. Apparatus according to claim 14 and wherein said cartridge fits into an apertured holder which is sealed by a plug, said plug comprising a threaded neck and a neck portion formed with a plurality of through holes, said holes being in fluid communication with a bore which is in turn in fluid communication with said apertured holder, and wherein said threaded neck can be screwed into a container through which the fluid can flow into the vessel, wherein the additive is mixed with the fluid as the fluid flows through said container.

17. Apparatus for cleaning or de-icing a vehicle window, comprising:

a reservoir for containing therein a washing fluid;

a vessel having an inlet through which the washing fluid is received from the reservoir and an outlet through which the fluid is discharged for cleaning a vehicle window; and characterized by further comprising a fluid authorization system for verifying use of an authorized fluid and wherein said fluid authorization system comprises a membrane constructed of a material that disintegrates if it is not in the presence of a fluid authorized for use.

* * * * *